(12) United States Patent
Boulet

(10) Patent No.: US 10,174,943 B2
(45) Date of Patent: Jan. 8, 2019

(54) SYSTEM AND METHOD FOR INTEGRATED CARBON DIOXIDE GAS SEPARATION FROM COMBUSTION GASES

(71) Applicant: INVENTYS THERMAL TECHNOLOGIES INC., Burnaby (CA)

(72) Inventor: Andre Boulet, Vancouver (CA)

(73) Assignee: INVENTYS THERMAL TECHNOLOGIES INC., Burnaby, BC (CA)

( * ) Notice: Subject to any disclaimer, the term of this patent is extended or adjusted under 35 U.S.C. 154(b) by 100 days.

(21) Appl. No.: 14/655,949

(22) PCT Filed: Dec. 31, 2013

(86) PCT No.: PCT/CA2013/051014
§ 371 (c)(1),
(2) Date: Jun. 26, 2015

(87) PCT Pub. No.: WO2014/100904
PCT Pub. Date: Jul. 3, 2014

(65) Prior Publication Data
US 2015/0338098 A1    Nov. 26, 2015

Related U.S. Application Data

(60) Provisional application No. 61/747,961, filed on Dec. 31, 2012.

(51) Int. Cl.
*B01D 53/04* (2006.01)
*F23J 15/02* (2006.01)
(Continued)

(52) U.S. Cl.
CPC .......... *F23J 15/02* (2013.01); *B01D 53/0407* (2013.01); *B01D 53/047* (2013.01);
(Continued)

(58) Field of Classification Search
None
See application file for complete search history.

(56) References Cited

U.S. PATENT DOCUMENTS 4,707,167 A   11/1987   Saito et al.
4,786,294 A   11/1988   Jonqueres et al.
(Continued)

FOREIGN PATENT DOCUMENTS

CA   2743718 A1   6/2010
EP   0578371 A1   1/1994
(Continued)

*Primary Examiner* — Anita Nassiri-Motlagh
(74) *Attorney, Agent, or Firm* — Palmer IP Inc.

(57) ABSTRACT

An integrated fuel combustion system with gas separation (adsorptive, absorptive, membrane or other suitable gas separation) separates a portion of carbon dioxide from a combustion gas mixture and provides for recycle of separated carbon dioxide to the intake of a fuel combustor for combustion. A process for carbon dioxide separation and recycle includes: admitting combustion gas to an adsorptive gas separation system contactor containing adsorbent material; adsorbing a portion of carbon dioxide; recovering a first product stream depleted in carbon dioxide for release or use; desorbing carbon dioxide from the adsorbent material and recovering a desorbed second product stream enriched in carbon dioxide for sequestration or use; admitting a conditioning and/or desorption fluid into the contactor and desorbing a second portion of carbon dioxide to recover a carbon dioxide enriched conditioning stream; and recycling a portion of the carbon dioxide enriched conditioning stream to an inlet of fuel combustor to pass through the fuel combustor for combustion.

29 Claims, 4 Drawing Sheets

(51) Int. Cl.
  *B01D 53/77* (2006.01)
  *B01D 53/62* (2006.01)
  *B01D 53/047* (2006.01)
  *B01D 53/06* (2006.01)
  *F23L 7/00* (2006.01)

(52) U.S. Cl.
  CPC ......... *B01D 53/0462* (2013.01); *B01D 53/06* (2013.01); *B01D 53/62* (2013.01); *B01D 53/77* (2013.01); *F23L 7/00* (2013.01); *B01D 2252/204* (2013.01); *B01D 2257/504* (2013.01); *B01D 2258/0283* (2013.01); *B01D 2259/403* (2013.01); *B01D 2259/4005* (2013.01); *B01D 2259/4009* (2013.01); *B01D 2259/40088* (2013.01); *F23C 2202/30* (2013.01); *F23J 2215/50* (2013.01); *F23J 2219/60* (2013.01); *F23L 2900/07001* (2013.01); *F23L 2900/07002* (2013.01); *Y02C 10/04* (2013.01); *Y02C 10/08* (2013.01); *Y02E 20/322* (2013.01); *Y02E 20/326* (2013.01)

(56) References Cited

U.S. PATENT DOCUMENTS

| | | | |
|---|---|---|---|
| 4,846,855 | A | 7/1989 | Tsujimoto |
| 4,872,889 | A | 10/1989 | Lepperhoff et al. |
| 5,232,882 | A | 8/1993 | Yoshimoto et al. |
| 5,569,455 | A | 10/1996 | Fukui et al. |
| 5,632,804 | A | 5/1997 | Schartz |
| 6,269,624 | B1 | 8/2001 | Frutschi et al. |
| 6,287,524 | B1 | 9/2001 | Hums et al. |
| 6,364,936 | B1 | 4/2002 | Rood et al. |
| 6,684,643 | B2 | 2/2004 | Frutschi et al. |
| 6,910,335 | B2 | 6/2005 | Viteri et al. |
| 6,957,539 | B2 | 10/2005 | Lebas et al. |
| 7,083,663 | B2 | 8/2006 | Shih et al. |
| 7,377,111 | B2 | 5/2008 | Agnew |
| 7,516,609 | B2 | 4/2009 | Agnew |
| 7,770,640 | B2 | 8/2010 | Kresnyak et al. |
| 7,964,020 | B2 | 6/2011 | Baker et al. |
| 8,025,715 | B2 | 9/2011 | Wijmans et al. |
| 8,034,168 | B2 | 10/2011 | Wijmans et al. |
| 8,220,247 | B2 | 7/2012 | Wijmans et al. |
| 8,220,248 | B2 | 7/2012 | Wijmans et al. |
| 8,247,124 | B2 | 8/2012 | Agnew |
| 8,506,678 | B2 | 8/2013 | Meulenberg et al. |
| 8,535,417 | B2 | 9/2013 | Shah |
| 8,596,075 | B2 | 12/2013 | Allam et al. |
| 8,631,639 | B2 | 1/2014 | Garcia-Crespo et al. |
| 8,728,423 | B2 | 5/2014 | Iijima et al. |
| 8,808,427 | B2 | 9/2014 | Leitgeb et al. |
| 8,900,347 | B2 | 12/2014 | Boulet et al. |
| 9,146,035 | B2 | 9/2015 | Boulet |
| 2001/0009124 | A1 | 7/2001 | Suzuki et al. |
| 2004/0057880 | A1 | 3/2004 | Treutler et al. |
| 2004/0206061 | A1 | 10/2004 | Ichikawa |
| 2004/0224210 | A1 | 11/2004 | Agnew |
| 2005/0095188 | A1 | 5/2005 | Matsumoto et al. |
| 2008/0120960 | A1 | 5/2008 | Agnew |
| 2008/0141638 | A1 | 6/2008 | Linhart et al. |
| 2008/0155950 | A1 | 7/2008 | Blackwell et al. |
| 2010/0081099 | A1 | 4/2010 | Kloosterman et al. |
| 2010/0242729 | A1 | 9/2010 | Radosz et al. |
| 2010/0251887 | A1* | 10/2010 | Jain ................ B01D 53/0462 95/46 |
| 2011/0042968 | A1 | 2/2011 | Tronstad |
| 2011/0139046 | A1 | 6/2011 | Fan et al. |
| 2011/0174156 | A1 | 7/2011 | Saunders et al. |
| 2011/0179799 | A1 | 7/2011 | Allam et al. |
| 2011/0247491 | A1 | 10/2011 | Leitgeb et al. |
| 2011/0311761 | A1 | 12/2011 | Boulet et al. |
| 2012/0090515 | A1 | 4/2012 | Didelon et al. |
| 2012/0125194 | A1 | 5/2012 | Caram et al. |
| 2012/0131897 | A1* | 5/2012 | Gonzalez ............. F04B 15/00 60/39.5 |
| 2012/0137698 | A1* | 6/2012 | Sjodin ................. F01K 23/10 60/774 |
| 2012/0159957 | A1 | 6/2012 | Tang et al. |
| 2012/0159962 | A1 | 6/2012 | Tang et al. |
| 2012/0174793 | A1 | 7/2012 | Eisenberger |
| 2012/0216547 | A1 | 8/2012 | Li et al. |
| 2012/0222552 | A1 | 9/2012 | Ravikovitch et al. |
| 2012/0251404 | A1 | 10/2012 | Degenstein et al. |
| 2012/0325088 | A1* | 12/2012 | Hornbostel ........... B01D 53/10 95/107 |
| 2013/0036905 | A1 | 2/2013 | Lively et al. |
| 2013/0058852 | A1 | 3/2013 | Baker et al. |
| 2013/0152595 | A1 | 6/2013 | Alekseev |
| 2013/0152787 | A1 | 6/2013 | Boulet et al. |
| 2013/0200625 | A1 | 8/2013 | Wei et al. |
| 2013/0333391 | A1 | 12/2013 | Sundaram et al. |
| 2014/0013766 | A1 | 1/2014 | Mittricker et al. |
| 2014/0041562 | A1 | 2/2014 | Grunnstrom |
| 2014/0053529 | A1 | 2/2014 | Allam et al. |
| 2014/0076213 | A1 | 3/2014 | Ingram et al. |
| 2014/0105809 | A1 | 4/2014 | Okumura et al. |
| 2014/0123669 | A1 | 5/2014 | Huntington et al. |
| 2014/0124705 | A1 | 5/2014 | Andersen et al. |
| 2014/0137780 | A1 | 5/2014 | Boulet |
| 2014/0144355 | A1 | 5/2014 | Kuczynski et al. |
| 2014/0175336 | A1 | 6/2014 | Gupta et al. |
| 2014/0234788 | A1 | 8/2014 | Johnson et al. |
| 2014/0366724 | A1 | 12/2014 | Wijmans et al. |

FOREIGN PATENT DOCUMENTS

| | | |
|---|---|---|
| EP | 1138369 A1 | 10/2001 |
| EP | 1208906 A2 | 5/2002 |
| EP | 1375851 A1 | 1/2004 |
| EP | 1429000 A1 | 6/2004 |
| EP | 2335804 B1 | 9/2014 |
| JP | 2003001061 A | 1/2003 |
| WO | 1994004258 A1 | 3/1994 |
| WO | 2006127889 A2 | 11/2006 |
| WO | 2007012143 A1 | 2/2007 |
| WO | 2008039771 A2 | 4/2008 |
| WO | 2008147676 A1 | 12/2008 |
| WO | 2009126607 A2 | 10/2009 |
| WO | 2010072305 A1 | 7/2010 |
| WO | 2010096916 A1 | 9/2010 |
| WO | 2010099208 A2 | 9/2010 |
| WO | 2012128926 A1 | 9/2012 |
| WO | 2012170925 A1 | 12/2012 |
| WO | 2013003955 A1 | 1/2013 |
| WO | 2014070667 A1 | 5/2014 |
| WO | 2014151656 A1 | 9/2014 |

* cited by examiner

US 10,174,943 B2

SYSTEM AND METHOD FOR INTEGRATED CARBON DIOXIDE GAS SEPARATION FROM COMBUSTION GASES

1. PRIOR APPLICATIONS

The present invention is related to previously filed PCT International Patent Application No. PCT/CA2012/050451, filed Jun. 29, 2012 and entitled "System and Method for Integrated Adsorptive Gas Separation of Combustion Gases", the contents of which are herein incorporated by reference in their entirety. The present invention is related to previously filed PCT International Patent Application No. PCT/CA2011/050521, filed Aug. 26, 2011 and entitled "Method of Adsorptive Gas Separation using Thermally Conductive Contactor Structure", the contents of which are herein incorporated by reference in their entirety. The present application is also related to previously filed PCT International Patent Application No. PCT/CA2010/000251, filed Feb. 26, 2010 and entitled "Parallel Passage Fluid Contactor Structure", the contents of which are also herein incorporated by reference in their entirety.

2. TECHNICAL FIELD

The present invention relates generally to methods for integrated carbon dioxide gas separation from combustion gases and systems therefore. More particularly, the present invention relates to methods of integrated gas separation of carbon dioxide from combustion gases and recycle of separated combustion gases to a combustion process and systems incorporating the same.

3. BACKGROUND OF THE INVENTION

Temperature swing adsorption methods are known in the art for use in adsorptive separation of multi-component gas mixtures. Many conventional temperature swing adsorption processes are used for preferentially adsorbing one component of a feed gas mixture on an adsorbent material to separate it from the remaining feed gas components, and then subsequently to regenerate the adsorbent material to desorb the adsorbed component and allow for cyclic reuse of the adsorbent material.

One type of industrial process where gas separation may be desirable includes combustion processes, where an oxidant and a carbon-containing fuel are combusted to generate mechanical power and by-products, for example, heat and a combustion process flue gas stream. The separation of one or more gas component from the combustion process flue gas may be desirable, such as for the removal and/or sequestration of carbon dioxide gas from fossil fuel combustion process flue gas mixtures, for example. In such applications, the additional power consumption or inefficiencies in conventional temperature swing adsorptive gas separation systems have typically led to undesirably inefficient integration of such temperature swing adsorptive gas separation systems into fossil fuel combustion processes, resulting in unacceptably high capital costs, reductions in energy efficiency and/or efficiency of gas separation, and operating costs, for example.

4. SUMMARY OF THE INVENTION

It is an object of the present invention to provide a method of integrated adsorptive gas separation for combustion gases that addresses some of the limitations of the prior art.

In one embodiment of the present invention, an integrated adsorptive gas separation process for separating at least a portion of a combustion gas stream from a fuel combustor is provided, wherein said combustion gas stream comprises at least carbon dioxide and water components, and the process comprises:
  (a) admitting a fuel stream to a fuel inlet and an oxidant stream to an oxidant inlet of said fuel combustor to produce said combustion gas stream;
  (b) admitting said combustion gas stream into an adsorptive gas separation system having a plurality of adsorbent contactors, each comprising at least one adsorbent material for adsorbing said carbon dioxide component;
  (c) admitting said combustion gas stream into an inlet of at least one adsorbent contactor;
  (d) adsorbing at least a portion of said carbon dioxide component of said combustion gas stream on at least one said adsorbent material;
  (e) recovering a first product stream depleted in said carbon dioxide component relative to said combustion gas stream from an outlet of at least one said adsorbent contactor;
  (f) desorbing a first portion of said carbon dioxide component adsorbed on at least one said adsorbent material in at least one said adsorbent contactor;
  (g) recovering a second product stream enriched in said carbon dioxide component relative to said combustion gas stream from at least one of said inlet and outlet of at least one said adsorbent contactor;
  (h) desorbing a second portion of said carbon dioxide component adsorbed on at least one said adsorbent material;
  (i) recovering a third product stream comprising said second portion of said carbon dioxide component from at least one of said inlet and outlet of at least one said adsorbent contactor; and
  (j) recycling at least a portion of said third product stream to the oxidant inlet of said fuel combustor for combustion.

In an optional embodiment of the integrated adsorptive gas separation process, in addition to desorbing a second portion of the carbon dioxide component, the process may further comprise admitting a conditioning stream into at least one said adsorbent contactor.

In a further embodiment of the present invention, an integrated adsorptive gas separation system for separating at least a portion of a combustion gas stream is provided, wherein said combustion gas stream comprises at least carbon dioxide and water components, and the system comprises:
  (a) a prime mover comprising an oxidant inlet, a combustion chamber and an exhaust outlet, that during operation produces said combustion gas stream;
  (b) an auxiliary heat exchanger comprising an auxiliary heat exchange conduit fluidly connected to receive and heat a desorption fluid stream by a heating circuit fluidly connected to receive a heating fluid stream;
  (c) an adsorptive gas separator comprising at least one adsorbent contactor, said contactor having an inlet and an outlet and comprising at least one adsorbent material for adsorbing said carbon dioxide component,
  wherein at least one said adsorbent contactor is fluidly connected to receive said combustion gas stream from said exhaust outlet of said prime mover into said inlet of at least one said adsorbent contactor, and to adsorb at least a portion of said carbon dioxide component onto at least one said adsorbent material, and wherein said adsorbent contactor is fluidly connected to receive said desorption fluid stream from said auxiliary heat exchange conduit to desorb at least a portion of said carbon dioxide component on at least one said adsorbent material, producing a carbon dioxide enriched product stream, and wherein said desorption fluid stream is admitted into said auxiliary heat exchange conduit at a feed stream at a pressure less than about 2 bar above ambient pressure.

In another embodiment of the present invention, an adsorptive gas separation process for separating at least a portion of a gas stream is provided, said gas stream comprising at least carbon dioxide and water components, wherein the process comprises:
 (a) admitting said gas stream into an adsorptive gas separation system having a plurality of adsorbent contactors;
 (b) admitting said gas stream into an inlet of at least one said adsorbent contactor having at least one adsorbent material for adsorbing said carbon dioxide component;
 (c) adsorbing at least a portion of said carbon dioxide component of said gas stream on at least one said adsorbent material;
 (d) recovering a first product stream depleted in said carbon dioxide component relative to said gas stream from an outlet of at least one said adsorbent contactor;
 (e) terminating the flow of said gas stream into said inlet of at least one said adsorbent contactor having at least one said adsorbent material;
 (f) desorbing a first portion of said carbon dioxide component adsorbed on at least one said adsorbent material in at least one said adsorbent contactor, by thermal heating of at least one said adsorbent material;
 (g) recovering a second product stream enriched in said carbon dioxide component from at least one of said inlet and outlet of at least one said adsorbent contactor;
 (h) desorbing a second portion of said carbon dioxide component adsorbed on at least one said adsorbent material; and
 (i) recovering a third product stream comprising said second portion of said carbon dioxide component from at least one of said inlet and outlet of at least one said adsorbent contactor, wherein steps (b) through (i) occur sequentially in at least one said adsorbent contactor.

In yet a further embodiment of the present invention, an integrated gas separation process for separating at least a portion of a combustion gas stream from a fuel combustor of an integrated combustion gas separation system comprising said fuel combustor and a gas separation system is provided, where said combustion gas stream comprises at least carbon dioxide, and water components, and the process comprises:
 (a) admitting a fuel stream to a fuel inlet and an oxidant stream to an oxidant inlet of said fuel combustor to produce said combustion gas stream;
 (b) admitting said combustion gas stream into said gas separation system;
 (c) sorbing at least a portion of said carbon dioxide component of said combustion gas stream within said gas separation system;
 (d) recovering a flue gas stream depleted in carbon dioxide relative to said combustion gas stream from said gas separation system;
 (e) desorbing at least a portion of said carbon dioxide component in said gas separation system;
 (f) admitting at least periodically an oxidant stream into said gas separation system forming a mixed oxidant stream; and
 (g) recovering at least periodically said mixed oxidant stream from said gas separation system and at least periodically admitting at least a portion of said mixed oxidant stream to said oxidant inlet of said fuel combustor, wherein at least periodically substantially all of said desorbed carbon dioxide component is recovered in said mixed oxidant stream.

In another embodiment of the present invention, an integrated combustion gas separation system for separating at least a portion of a combustion gas stream is provided, where the combustion gas stream comprises at least carbon dioxide and water components, and the system comprises:
 (a) a fuel combustor comprising a fuel inlet, an oxidant inlet, and an exhaust outlet, that during operation produces said combustion gas stream;
 (b) a gas separation system comprising a combustion gas inlet, an oxidant inlet, a flue gas outlet, a mixed gas outlet, and at least one sorbent contactor having at least one sorbent material, operable for separating said carbon dioxide component from said combustion gas stream by sorption of at least a portion of said carbon dioxide component on at least one said sorbent material;
 (c) a combustion gas conduit fluidly connected to said exhaust outlet of said fuel combustor and said combustion gas inlet of said gas separation system, and
 (d) a mixed gas conduit fluidly connected to said mixed gas outlet of said gas separation system and said oxidant inlet of said fuel combustor for recovering substantially all of a desorbed portion of said carbon dioxide component from said adsorptive gas separation system.

5. BRIEF DESCRIPTION OF THE DRAWINGS

The systems and methods for integrated carbon dioxide gas separation from combustion gases according to exemplary embodiments of the present invention will now be described with reference to the accompanying drawing figures, in which.

Figure 3:
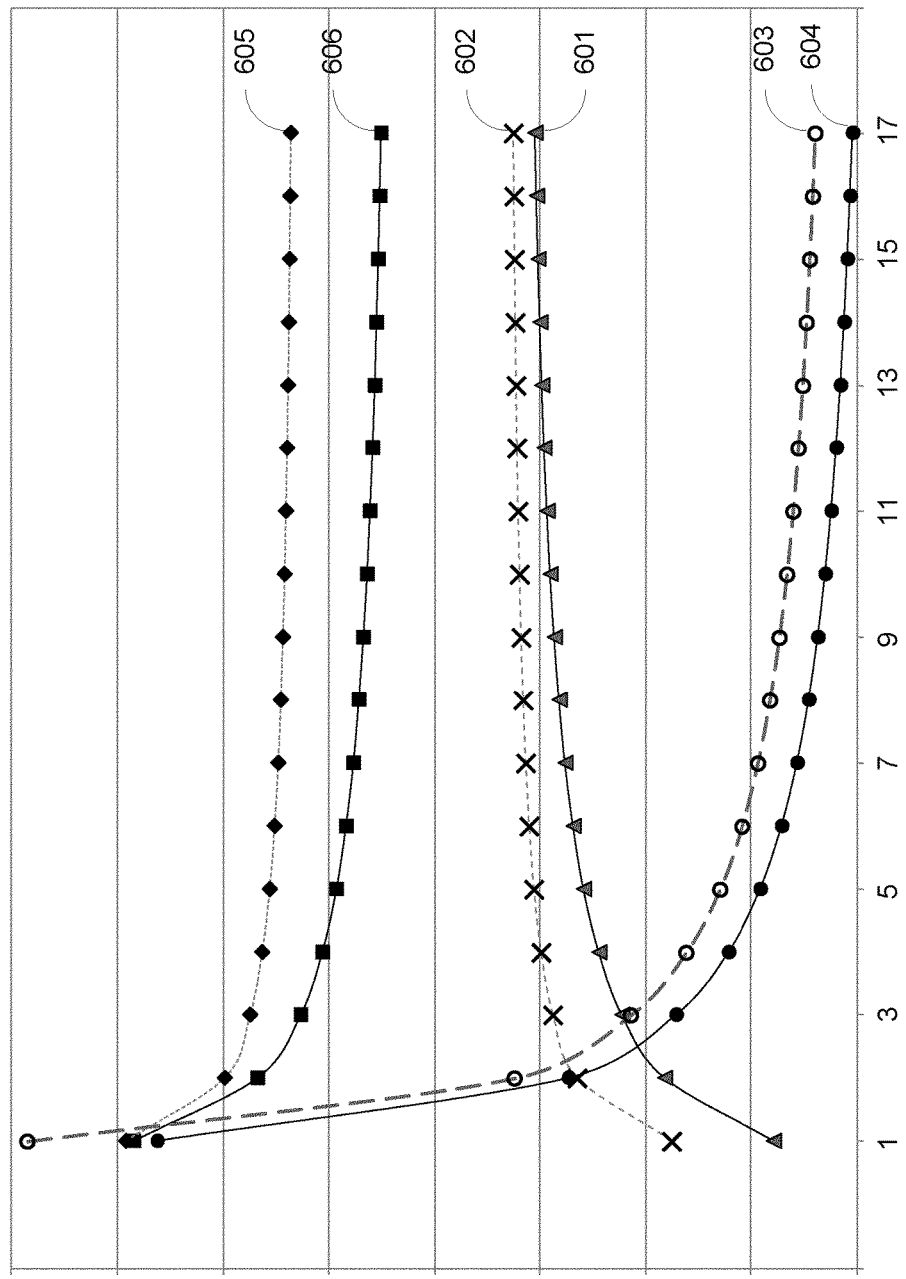

FIG. 3 is a graph illustrating a computer simulated model of various operating plots along various operating points of an exemplary integrated carbon dioxide gas separation system according to an embodiment of the present invention implementing an exemplary integrated carbon dioxide gas separation process according to an embodiment of the invention, using a gas turbine which employs natural gas as a fuel, air as an oxidant and recycle of a carbon dioxide enriched stream to the gas turbine.

Figure 4:
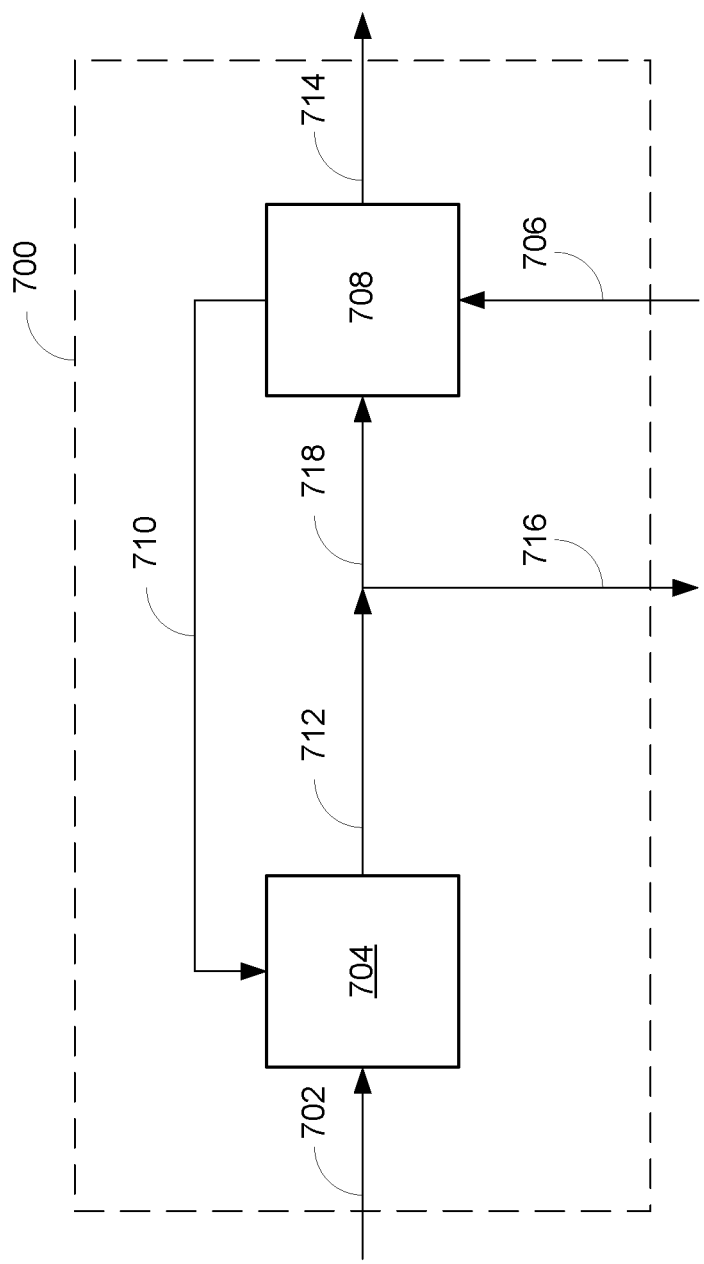

FIG. 4 is a schematic diagram illustrating an integrated gas separation system according to an embodiment of the present invention, comprising a fuel combustor and a gas separation system for separating at least a portion of the carbon dioxide component from a combustion gas stream produced by the fuel combustor.

Like reference numerals refer to corresponding parts throughout the several views of the drawings.

6. DETAILED DESCRIPTION OF THE INVENTION

In one embodiment of the present invention, an integrated carbon dioxide gas separation process is provided for separating at least a portion of a combustion gas stream from a fuel combustor, wherein the combustion gas stream comprises at least carbon dioxide and water (including water vapor and/or steam) components. The integrated carbon dioxide gas separation process may include, but is not limited to, an adsorption process (such as using adsorbent materials as described further below), a chemical absorption process (for example, using amine-based solvent), and/or membrane separation processes (for example, using zeolite or ceramic membranes). Furthermore, the integrated carbon dioxide gas separation process may comprise admitting substantially all of a combustion gas stream from a fuel combustor to a gas separation device or admitting at least a portion of the combustion gas stream from a fuel combustor to a gas separation device. It is to be understood that the processes disclosed herein and as described in further detail below, may be used with any suitable known carbon dioxide gas separation process and/or method, and using any suitable known carbon dioxide gas separation device or system, and is not limited to the exemplary adsorptive gas separation processes described according to several exemplary embodiments, but also includes the alternative use of other suitable non-adsorptive carbon dioxide gas separation processes, methods, devices or systems, for example.

In an exemplary embodiment an adsorptive gas separation process may comprise a thermal swing adsorption (hereinafter "TSA") process, wherein at least one desorption step for desorption of a combustion gas component adsorbed on an adsorbent material is driven primarily by thermal heating of the adsorbent material. In an alternative embodiment though, alternative desorptive mechanisms such as purge or displacement purge with a suitable purge fluid may also be used alone or in combination with thermal heating for desorption of adsorbed components. Alternatively the adsorptive gas separation process may comprise a pressure swing adsorption (hereinafter "PSA") process, wherein at least one desorption step for desorption of a combustion gas component adsorbed on an adsorbent material for selectively adsorbing carbon dioxide (hereinafter "adsorbent material") is driven primarily by a swing in pressure of the adsorbent contactor comprising the adsorbent material. In an alternative embodiment though, alternative adsorptive mechanisms such as purge or displacement purge with a purge fluid, or thermal heating of the adsorbent material may also be used alone or in combination with pressure swing for desorption of adsorbed combustion gas components, for example. In yet another alternative, the adsorptive gas separation process may comprise a partial pressure swing adsorption (hereinafter "PPSA") process, wherein at least one desorption step for desorption of a combustion gas component adsorbed on an adsorbent material is driven primarily by a swing or difference in partial pressure or concentration of at least one adsorptive gas component in the adsorbent contactor comprising the adsorbent material. In another alternative embodiment, alternative adsorptive mechanisms such as thermal heating of the adsorbent material or pressure swing may also be used alone or in combination with partial pressure swing for desorption of adsorbed combustion gas components, for example.

In one embodiment according to the present invention, the fuel combustor may comprise any suitable type of fuel combustion device which uses primarily ambient air as a source of an oxidant reactant for combustion. In other embodiments, alternative oxidant reactants may be used in the fuel combustor, such as but not limited to air supplemented with oxygen or enriched in oxygen above ambient levels, substantially oxygen, air depleted in oxygen, a gas stream which contains less oxygen than ambient air, and recycled combustion gas, for example. A fuel reactant such as but not limited to gaseous fuel, liquid fuel and/or solid fuel may be used for combustion in the fuel combustor, according to embodiments of the invention. In a particular embodiment, the fuel combustor may comprise at least one of: a turbine fuel combustor such as a gas turbine combustor, a combined cycle gas turbine combustor, light hydrocarbon combustor, liquid-fuel (such as oil/kerosene/diesel/gasoline/jet fuel and other liquid fuel fired) combustor, coal-fired combustor (including solid, pulverized, gasified or other forms of coal-fueled combustors such as coal-fired power generation plants), biomass solid and/or liquid fuel combustor, steam generator/boiler combustor, and process heater combustor (such as may be used in refinery and/or industrial processes to heat process fluids and/or gases), for example.

In one embodiment, the integrated adsorptive gas separation process may comprise admitting a fuel stream to a fuel inlet and an oxidant stream to an oxidant inlet of a fuel combustor to produce a combustion gas stream. The process may then comprise an adsorption step of admitting at least a portion of the combustion gas stream from the fuel combustor comprising at least carbon dioxide and water components, as a feed mixture, into an adsorptive gas separation system. The combustion gas stream may be admitted into the inlet of at least one adsorbent contactor having at least one adsorbent material in the adsorptive gas separation system. The process may then comprise adsorbing at least a portion of the carbon dioxide component on the adsorbent material. The process may also comprise recovering a first product stream depleted in the carbon dioxide component relative to the feed mixture or combustion gas stream from an outlet of the adsorbent contactor and adsorptive gas separation system. In one embodiment, the adsorption step may desirably result in substantially all of the carbon dioxide component of the combustion gas stream being adsorbed on the adsorbent material in the adsorptive gas separation system, so that the first product stream recovered from the adsorbent contactor may desirably be substantially free of carbon dioxide. The at least substantially complete removal of carbon dioxide from the combustion gas stream may be desirable to allow the first product stream to be released as a flue gas stream from the adsorptive gas separation system into the environment substantially free of carbon dioxide, such as to reduce carbon emissions from the operation of the fuel combustor. In a particular embodiment, the first product stream may desirably have a carbon dioxide concentration that is less than the ambient carbon dioxide concentration of the environment, such as below the approximately 390 ppm ambient carbon dioxide concentration of the atmosphere, so that the released first product stream during the adsorption step may in net effect remove carbon dioxide from the atmosphere.

According to one embodiment, a suitable adsorbent contactor having at least one adsorbent material may typically have a finite capacity to adsorb carbon dioxide from a combustion gas stream, for example. The adsorption capacity may desirably be cyclically restored by desorbing the carbon dioxide and any other components adsorbed on the adsorbent material. Typically, in such an embodiment, the desorbing of carbon dioxide and/or any other components adsorbed on the adsorbent material may desirably be carried out before the adsorbent capacity of the adsorbent contactor has been reached. In a particular embodiment, during desorption of the adsorbent material and dependent on the desorptive mechanism(s) employed (such as but not limited to heating, purge, pressure swing, partial pressure swing desorptive mechanisms), it may be desirable to reduce, or substantially terminate the admittance and flow of the combustion gas stream to and/or through the adsorbent contactor in order to, for example, reduce dilution of the desorption fluid by the combustion gas stream and/or reduce heat loss from the adsorbent material. In a particular embodiment, the adsorption process may comprise terminating the flow of the combustion gas stream through an adsorbent contactor during desorption by, for example, diverting the combustion gas stream away from a first adsorbent contactor (when desorption is desired) to a second adsorbent contactor (for adsorption of the combustion gas stream) in a multi-contactor adsorptive gas separation system.

In one embodiment the integrated adsorptive gas separation process may comprise a first desorption step comprising heating an adsorbent contactor, such as by admitting a suitable desorption fluid or stream, such as but not limited to a steam stream, for example, into the adsorbent contactor, or alternatively by directly heating the adsorbent contactor such as by electrical joule heating of the adsorbent contactor and/or adsorbent material within the adsorbent contactor, so as to desorb a first portion of the carbon dioxide component adsorbed on an adsorbent material in the adsorbent contactor. As noted above, in one embodiment, the desorption of adsorbed carbon dioxide may be primarily thermally driven such as by a TSA process, but may also comprise one or more secondary desorption mechanisms such as a pressure swing desorption, partial pressure desorption and/or purge desorption mechanism, for example. In a particular embodiment, the desorption of adsorbed carbon dioxide may comprise a first desorption step which is primarily thermally driven, and a second desorption step which may be primarily driven by a purge and/or partial pressure desorption mechanism, for example. In an alternative embodiment, the desorption of adsorbed carbon dioxide may comprise a first desorption step which is primarily driven by a purge and/or partial pressure desorption mechanism, and a second desorption step which may be primarily thermally driven, for example. In a further alternative embodiment, the desorption of adsorbed carbon dioxide may be primarily driven by one or more of a pressure swing and/or partial pressure swing process, in combination or in place of a TSA process, for example. In one embodiment, the integrated adsorptive gas separation process may comprise recovering a second product stream enriched in carbon dioxide from either the inlet or outlet of the adsorbent contactor. In a further embodiment, the process may also comprise recovering a third product stream also comprising carbon dioxide, where the second product stream comprises carbon dioxide which is desorbed during a first desorption step, and the third product stream comprises carbon dioxide which is desorbed during a second desorption step, for example.

In a preferred embodiment, only a portion of the adsorbed carbon dioxide component is desorbed from the adsorbent material of an adsorbent contactor and recovered in the second product stream, so that at least a portion of the carbon dioxide component remains adsorbed on the adsorbent material of the adsorbent contactor. In one embodiment, the desorbed portion of carbon dioxide component recovered in the second product stream may comprise only about a third of the total adsorbed carbon dioxide component, leaving about two thirds of the carbon dioxide component adsorbed on the adsorbent material of the adsorbent contactor at the end of the first desorption step, for example. Therefore, in one such embodiment, because only a portion of the adsorbed carbon dioxide component is desorbed in the first desorption step, the amount of heat energy required for desorption may desirably be reduced compared to processes where the majority or substantially all of the adsorbed carbon dioxide component is desorbed. In one embodiment, steam may be used as a desorption fluid to heat the adsorbent material and desorb the first portion of carbon dioxide component such as by heating and/or displacement purge desorptive mechanisms, and accordingly, a significantly reduced amount of steam may desirably be required to desorb only a portion (such as about a third, for example) of the adsorbed carbon dioxide component from the adsorbent material of the adsorbent contactor. The second product stream may desirably comprise substantially pure carbon dioxide, or in the case of steam being used to purge or desorb the adsorbent contactor, desirably comprises substantially only carbon dioxide and steam. Accordingly, such second product stream may be desirably highly concentrated in carbon dioxide and thereby suitable to be compressed efficiently (with condensation knockout of any steam component) for use and/or storage such as for carbon sequestration or other applications such as enhanced oil recovery purposes to reduce carbon emissions from the operation of the fuel combustor.

In another embodiment, a second product stream enriched in carbon dioxide may be desirably selected and controlled to supply a stream mixture with a concentration of carbon dioxide of less than about 97%, or a concentration of carbon dioxide of less than about 90%, or a concentration of carbon dioxide of less than about 70%, or a concentration of carbon dioxide of less than about 50%, for example. In a particular such embodiment, at least one adsorbent material that selectively adsorbs carbon dioxide may be used in the exemplary process, and may desirably provide a substantially contaminant free carbon dioxide stream during at least a first desorption step. The substantially contaminant free carbon dioxide stream, such as a second product stream comprising essentially carbon dioxide and steam, may desirably be used in applications requiring carbon dioxide, for example, horticulture, biomass production, water treatment, food production, and in the production of chemicals and polymers, for example. This availability of a selective concentration of carbon dioxide and/or a substantially contaminant free carbon dioxide stream from the second product stream according to exemplary embodiments may desirably reduce the cost of supplying a carbon dioxide stream, by reducing the need for additional downstream purification processes and/or devices.

Following the first desorption step, a second desorption step may be used in a further embodiment to desorb a second portion of the carbon dioxide component adsorbed on the at least one adsorbent material in the at least one adsorbent contactor. In one such embodiment, the integrated adsorptive gas separation process may comprise admitting a suitable conditioning stream, such as but not limited to an ambient air stream, hot air stream or a hot flue gas stream, for example, into the adsorbent contactor for desorbing a second portion of the carbon dioxide component adsorbed on the at least one adsorbent material in the at least one adsorbent contactor. The process may then comprise recovering a third product stream comprising the second portion of the carbon dioxide component from either the inlet or outlet of the at least one said adsorbent contactor. The desorption of the second portion of the carbon dioxide component adsorbed on the adsorbent contactor may be driven by at least one of a TSA, PSA and PPSA desorption process. At least a portion of the carbon dioxide containing conditioning stream or third product stream is then recycled through the fuel combustor during operation, via an oxidant inlet of the fuel combustor and a third product stream conduit. In one embodiment, the third product stream may desirably have a higher carbon dioxide concentration than the ambient air, such as a carbon dioxide concentration above the about 400 ppm atmospheric carbon dioxide concentration, for example. In another embodiment, the third product stream may desirably have a higher carbon dioxide concentration than the combustion gas produced by the combustor. In one embodiment, the conditioning stream admitted into an adsorbent contactor during a second desorption step may desirably be effective to desorb a majority, or more preferably, substantially all of the remaining carbon dioxide component adsorbed on the adsorbent material of the adsorbent contactor, and to recycle the second portion of the carbon dioxide component to the fuel combustor via an oxidant inlet.

In another embodiment according to the present invention, the integrated adsorptive gas separation process may comprise:

(a) admitting a fuel stream to a fuel inlet and an oxidant stream to an oxidant inlet of a fuel combustor to produce a combustion gas stream comprising carbon dioxide and water components;

(b) admitting the combustion gas stream into an adsorptive gas separation system having a plurality of adsorbent contactors;

(c) admitting the combustion gas stream into an inlet of at least one adsorbent contactor having at least one adsorbent material for adsorbing said carbon dioxide component;

(d) adsorbing at least a portion of the carbon dioxide component of the combustion gas stream on at least one adsorbent material;

(e) recovering a first product stream depleted in the carbon dioxide component relative to the combustion gas stream from an outlet of at least one adsorbent contactor;

(f) terminating the flow of the combustion gas stream into the at least one adsorbent contactor;

(g) desorbing a first portion of the carbon dioxide component adsorbed on at least one adsorbent material in at least one adsorbent contactor;

(h) recovering a second product stream enriched in the carbon dioxide component relative to the combustion gas stream from at least one of the inlet and outlet of at least one adsorbent contactor;

(i) desorbing a second portion of the carbon dioxide component adsorbed on at least one adsorbent material;

(j) recovering a third product stream comprising the second portion of the carbon dioxide component from at least one of the inlet and outlet of at least one adsorbent contactor, and (k) admitting at least a portion of the third product stream to the oxidant inlet of the fuel combustor for combustion In a particular embodiment, desorbing a second portion of the carbon dioxide component adsorbed on at least one adsorbent material may comprise admitting a conditioning fluid stream into at least one adsorbent contactor to desorb the second portion of the carbon dioxide component from the adsorbent material. In one such embodiment, the conditioning fluid stream may comprise at least one of air, heated air, steam, combustion gas, an oxidant enriched fluid stream or any other suitable conditioning fluid, and the recovered third product stream may comprise the conditioning fluid stream and the second portion of the adsorbed carbon dioxide component. In another particular embodiment, the second portion of the carbon dioxide component may be desorbed by one or more of a TSA, PSA, and a PPSA desorption mechanism.

In a further embodiment, the integrated adsorptive gas separation process may comprise admitting a desorption fluid stream into the adsorbent contactor in a first desorption step of desorbing a first portion of the carbon dioxide component adsorbed on the at least one adsorbent material in the at least one adsorbent contactor, where the desorption fluid may comprise at least one of air, heated air, steam, combustion gas, flue gas, or another suitable desorption fluid. Following the first desorption step, in a particular such embodiment, a second desorption step may comprise admitting a conditioning fluid stream into the adsorbent contactor for desorbing a second portion of the carbon dioxide component adsorbed on the at least one adsorbent material in the at least one adsorbent contactor, where the conditioning fluid comprises steam, or another suitable conditioning fluid.

In yet another embodiment, the step of desorbing a first portion of the carbon dioxide component adsorbed on at least one adsorbent material in at least one adsorbent contactor may comprise heating at least one of the adsorbent material and the adsorbent contactor. In one such embodiment, such heating may comprise direct heating such as by electrical resistance or joule heating of the adsorbent material and/or adsorbent contactor, or indirect heating such as by admitting a heated fluid into the adsorbent contactor, for example. Similarly, in another embodiment, the step of desorbing a second portion of the carbon dioxide component adsorbed on at least one adsorbent material may also comprise heating at least one of the adsorbent material and the adsorbent contactor. In one such embodiment, such heating may comprise direct heating such as by electrical resistance or joule heating of the adsorbent material and/or adsorbent contactor, or indirect heating such as by admitting a heated fluid into the adsorbent contactor, for example.

In one embodiment, a primary benefit of the recycling of the second portion of the adsorbed carbon dioxide component to the fuel combustor is to increase the concentration of carbon dioxide in the combustion gas stream which is admitted to the integrated adsorptive gas separation system as a feed mixture, since the combustion gas stream will contain both the recycled carbon dioxide component, as well as a carbon dioxide component generated during the combustion process. Particularly in the case of fuel combustors where the baseline carbon dioxide concentration of the combustion gas stream is relatively low, such as for gas turbines, and in an additional embodiment in some coal-fired thermal combustors, steam generators/boilers and process heaters, for example, such that an increase in carbon dioxide concentration in the combustion gas stream may desirably increase the efficiency of the adsorptive separation of carbon dioxide in the adsorptive gas separation system compared to a combustion gas streams in systems that do not recycle the carbon dioxide component or a carbon dioxide stream more dilute in carbon dioxide. Such increased efficiency of adsorptive carbon dioxide separation resulting from the increased carbon dioxide concentration in the combustion gas stream provided as a feed mixture to the adsorptive gas separation system in certain embodiments of the present invention may desirably allow for at least one of: decreased energy consumption for desorption of adsorbed carbon dioxide such as in the form of decreased steam, other purge fluid or electrical current consumption or desorption heating requirements; increased carbon dioxide purity in the second product stream enriched in carbon dioxide; reduced size and/or capital cost of the adsorptive gas separation system; and improved recovery of carbon dioxide from the adsorptive gas separation system, for example.

In one embodiment, the desorption of the second portion of carbon dioxide component may be accomplished primarily by displacement purge or inert purge by the ambient air stream and/or other conditioning stream, and in such a case the energy required for desorbing the carbon dioxide component may be desirably small. The ambient air and/or conditioning stream used to desorb the second portion of carbon dioxide component may also desirably be cooled by the effect of the heat of desorption of the carbon dioxide, and therefore the third product stream or carbon dioxide enriched conditioning stream may be desirably cooler and denser when recycled to the fuel combustor via the oxidant inlet, relative to the available surrounding ambient air. In one embodiment the third product stream may be cooled to a temperature below the ambient air temperature. A cool and dense conditioning stream may desirably improve the efficiency of the fuel combustor, such as in the case where the fuel combustor operates at supra-atmospheric pressures, such as in gas turbine combustors, where the oxidant is compressed before combustion, for example. In applications where a fuel combustor operates at substantially atmospheric or near atmospheric pressure, the conditioning stream may desirably be preheated to improve the efficiency of the fuel combustor. In a further embodiment, the increased carbon dioxide concentration in the oxidant stream of the fuel combustor due to recycle of carbon dioxide from the adsorptive gas separation system may desirably provide for an increased heat capacity of the oxidant stream relative to a system where only ambient air was used as the oxidant, since carbon dioxide has a higher specific heat capacity in comparison to air. Fuel combustors such as gas turbines, for example, typically operate with an excess amount of air (non-combusted air) for combustion in order to maintain the temperature of combustion below a critical or desired level. Increasing the heat capacity of the oxidant stream of a fuel combustor or gas turbine may desirably allow the gas turbine to operate with a reduced oxidant stream mass flow and/or increased fuel firing rate (thereby increasing net power output of the fuel combustor) while maintaining the temperature of combustion below a critical or desired level, resulting in an increase in efficiency for the gas turbine.

In an alternative embodiment where the fuel combustor operates at substantially atmospheric pressures, such as in typical coal-fired, steam generator/boiler, or process heater combustors, the conditioning stream or air stream used to desorb the second portion of carbon dioxide component may instead be heated by the comparatively hot adsorbent contactor and/or adsorbent material during the second desorption step. In such case, the third product stream or carbon dioxide enriched conditioning stream recycled to the oxidant inlet of the fuel combustor may desirably be heated to a temperature above the ambient air temperature, and may desirably improve the efficiency of the atmospheric fuel combustor.

In a further embodiment, in fuel combustors which include heat transfer or recovery from combustion gas streams, such as typical combined cycle gas turbine plants, thermal power plants, steam generators/boilers, process heaters, and the like, the increase in carbon dioxide concentration in the combustion gas stream due to recycling of a portion of the adsorbed carbon dioxide to the fuel combustor via an oxidant inlet may also desirably increase the heat capacity of the combustion gas stream, due to the relatively higher heat capacity of carbon dioxide compared to air. Such an increase in the heat capacity of the combustion gas stream may desirably allow for greater convective heat transfer efficiency in the heat transfer/recovery portion of the combustion system, such as in heat exchangers and/or heat recovery steam generator (hereinafter "HRSG") systems, for example.

In yet a further embodiment, in fuel combustors which include radiant heat transfer or recovery from combustion gas streams, such as typical steam generators/boilers, process heaters, and some thermal power plants and the like, the increase in carbon dioxide concentration in the combustion gas stream due to recycling of a portion of the adsorbed carbon dioxide to the fuel combustor may also desirably increase the radiant heat transfer capacity of the combustion gas stream, due to the infrared (IR) emission spectrum of the increased concentration carbon dioxide component of the combustion gas stream, relative to the negligible radiant heat transfer capacity of the air component of the combustion gas stream. Such an increase in the radiant heat transfer capacity of the combustion gas stream may desirably allow for greater radiant heat recovery in a radiant zone of heat exchangers in such fuel combustors, for example.

In another embodiment, the increase in carbon dioxide concentration in the combustion gas stream due to recycling of a portion of the adsorbed carbon dioxide to the fuel combustor via an oxidant inlet may also desirably result in a lower adiabatic flame temperature of combustion relative to an oxidant stream of the fuel combustor comprising a lower carbon dioxide concentration, which may desirably result in reduced nitrogen oxide production during the combustion process. Such reduced nitrogen oxides in the combustion gas stream and flue gas stream may be desirable to improve emissions quality and/or to reduce requirements for emission treatment systems, for example.

In another embodiment of the present invention, water vapor in the form of steam may be used in a conditioning fluid stream to desorb carbon dioxide from the adsorbent material of the adsorbent contactor and may be provided for recycle to the fuel combustor via an oxidant inlet, such as for fuel combustor applications implementing a pre-combustion water injection system. Requirements for water and of the water injection system may be desirably decreased by recycling the water vapor from the adsorption process, and/or recovery of water from steam purge desorption steps may be increased, for example.

In one embodiment, the present integrated adsorptive gas separation process according to the above may then desirably be repeated to provide for a substantially continuous or repeated cyclic combustion gas separation method for separating a first portion of the carbon dioxide component from the combustion gas stream, such as for carbon sequestration purposes. In a particular embodiment, an integrated adsorptive gas separation system for operation according to the integrated adsorptive gas separation process may desirably comprise two or more adsorbent contactors, so as to provide for staggered and/or sequential operation of the integrated adsorptive gas separation process and may desirably allow continuous and/or semi-continuous adsorptive separation from the combustion gas stream of the fuel combustor. In one embodiment, an integrated adsorptive separation system may comprise three or more adsorbent contactors such that the first product stream may be recovered from a first adsorbent contactor while the second product stream may be recovered from a second adsorbent contactor, and the carbon dioxide containing conditioning fluid stream or third product stream may be recovered from a third adsorbent contactor, substantially simultaneously. Any suitable mechanical arrangement may be implemented in the integrated adsorptive gas separation system to provide for and control the fluid flows required for implementation of the integrated adsorptive gas separation process, such as an integrated adsorptive gas separation system using mechanical/pneumatic or other types of valves or other flow control devices for example, to implement the fluid flows of the steps of the present TSA and/or PPSA and/or PSA adsorption process, as are known in the art for systems comprising one, two, or three or more adsorbent contactors containing adsorbent material. A rotary wheel or rotor mechanical arrangement where the adsorbent contactors containing one or more adsorbent materials are located in the rotating component may be implemented to provide for and control the fluid flows required to implement the integrated adsorptive gas separation process, such as may be similar to those used in a rotary enthalpy or other adsorbent wheel, for example.

In one embodiment, the one or more adsorbent contactors may comprise parallel passage adsorbent contactors. Suitable parallel passage adsorbent contactors may comprise a plurality of substantially parallel fluid flow passages oriented in a first axial direction between an inlet and outlet of the adsorbent contactor in order to permit fluid to flow through the adsorbent contactor, and cell walls which comprise at least one adsorbent material situated between and separating the fluid flow passages. The parallel passage adsorbent contactor may also desirably comprise a plurality of axially continuous thermally conductive filaments oriented in the axial direction of the contactor and in direct contact with the at least one adsorbent material comprised in or on the cell walls of the adsorbent contactor. Certain such parallel passage adsorbent contactor structures which may be suitable for use in implementing the integrated adsorptive gas separation process are described in the applicant's co-pending PCT international patent application filed as PCT/CA2010/000251 on Feb. 26, 2010, the contents of which are herein incorporated by reference as though they had formed part of this application as presently filed. In one or more alternative embodiments, alternative adsorbent contactors may include packed bed contactors, structured adsorbent contactors, and metal fiber contactors, for example.

Figure 1:
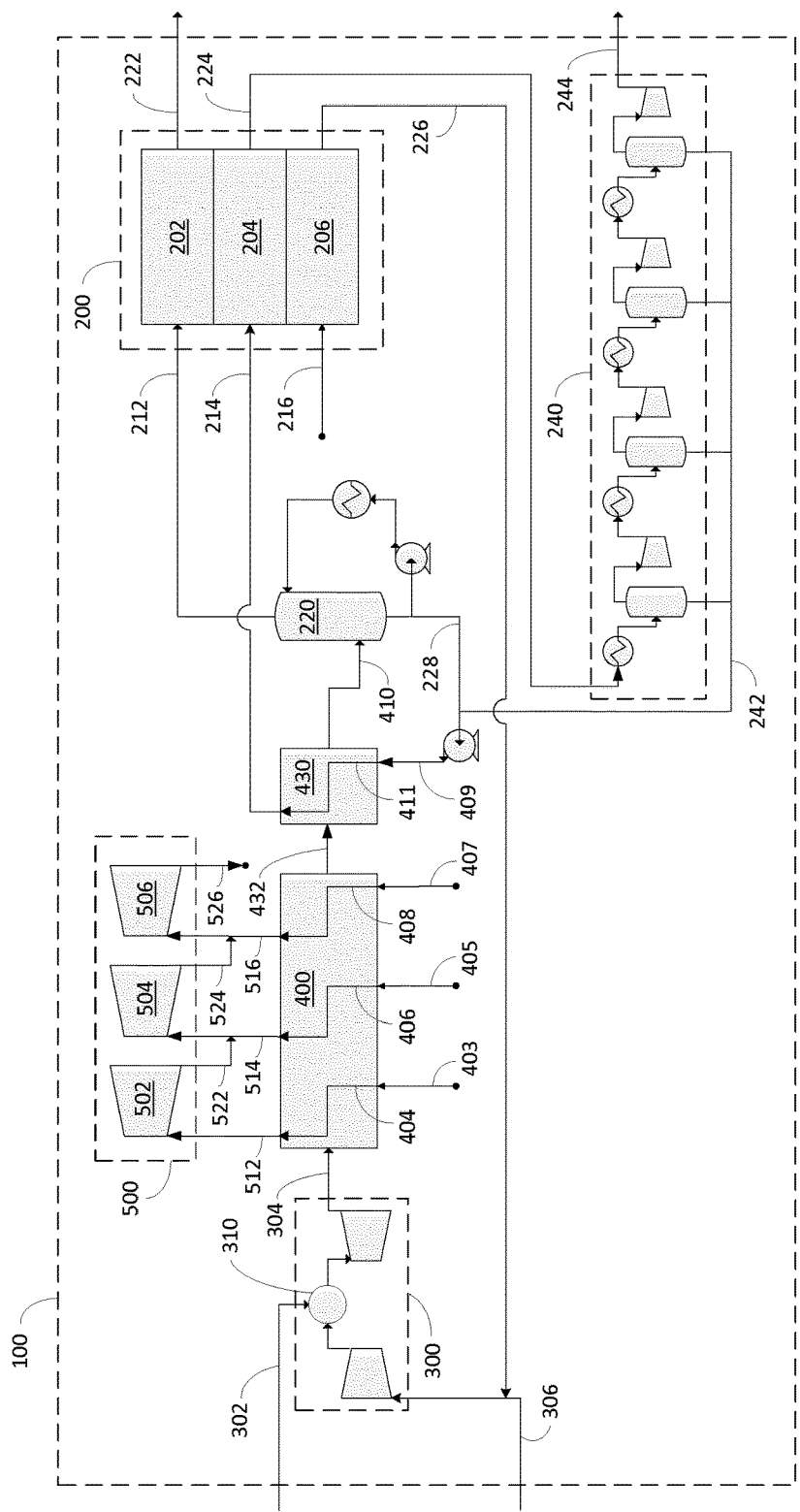
FIG. 1 is a schematic diagram illustrating an integrated adsorptive gas separation system according to an embodiment of the present invention, comprising a gas turbine, a heat recovery steam generator (HRSG), a steam turbine, an auxiliary heat exchanger, a combustion gas cooler, an adsorptive gas separation system, and a gas compression system.

Referring now to the drawings, FIG. 1 illustrates a schematic view of an exemplary integrated adsorptive gas separation system 100 for separation of combustion gases from a fuel combustor, such as an exemplary gas turbine fuel combustor 300 for use in accordance with embodiments of the present invention. In one embodiment, the integrated adsorptive gas separation system 100 may be used for implementing the present process for integrated adsorptive gas separation from combustion gas, and/or more particularly the present process for integrated adsorptive gas separation of carbon dioxide from combustion gas described herein. Integrated adsorptive gas separation system 100 comprises a prime mover or turbine fuel combustor 300, such as an exemplary natural gas power generation turbine. Suitable examples of industrial and aeroderivative gas turbines are manufactured by General Electric Company, of Schenectady, N.Y., USA, Siemens AG, of Erlangen, Germany, and Rolls-Royce plc, of London, England, for example. Exemplary gas turbine fuel combustor 300 comprises an oxidant inlet for admitting an oxidant stream 306 (typically an air stream, but may include one or more other suitable oxidants or oxidant streams, such as an air stream supplemented with oxygen, an enriched oxygen stream, a substantially oxygen stream, an oxidant stream containing less oxygen than the ambient air, and/or an oxidant stream with combustion exhaust gas recirculation, for example), into gas turbine fuel combustor 300 for admixture with a fuel stream 302 (typically natural gas comprising primarily methane, but may include any other suitable gaseous, vapor, liquid, or airborne combustible fuel) admitted via a fuel inlet in a combustion chamber 310 to be combusted and produce during operation a combustion gas stream 304 comprising at least carbon dioxide and water components, which is exhausted from gas turbine fuel combustor 300, such as through an exhaust outlet.

Typically, a conventional gas turbine using natural gas as a fuel which may be operated with an excess air ratio of about 2.0-2.5 in a conventional method, for example, without recycle of a combustion gas stream or a carbon dioxide stream, may produce a combustion gas stream containing about 3%-3.5% carbon dioxide. In comparison, a conventional fuel combustor such as a boiler using coal as a fuel may typically produce a combustion gas stream containing about 12%-15% carbon dioxide. Exemplary gas turbine fuel combustor 300 may be connected to power one or more mechanical loads such as mechanically driven equipment (not shown in FIG. 1) including, for example, a generator to produce electrical power. In one embodiment, integrated adsorptive gas separation system 100 may comprises a prime mover, such as gas turbine fuel combustor 300, coupled to one or more mechanical equipment loads where at least one of the mechanical equipment loads comprises a gas compressor for compressing a second product stream. A gas compressor which is coupled to the prime mover may desirably be more energy efficient compared to a gas compressor driven by an electric motor or a gas compressor driven by a secondary mover or engine. Such increased efficiency due to direct drive of a gas compressor by the prime mover (such as gas turbine fuel combustor 300) by reducing the number of devices required to drive the gas compressor, such as for example, an electric generator, electric motor or steam generator, which would each comprise inherent energy conversion losses.

In one embodiment, integrated adsorptive gas separation system 100, comprises a combined cycle gas turbine (CCGT) plant and in addition to exemplary gas turbine combustor 300 also comprises an exemplary heat recovery steam generator (HRSG) 400 and a steam turbine 500 fluidly connected to each other, for recovery of heat energy from the combustion gas stream 304. In one such embodiment, the HRSG 400 may comprise three heat recovery steam generation and expansion loops. HRSG 400 may comprise a gas inlet, a gas outlet, a plurality of feed inlets, a steam outlet, and one or more heat exchange conduits where HRSG 400 is fluidly connected to receive a combustion gas stream 304 from gas turbine 300 via a gas inlet of the HRSG 400. In another embodiment, the HRSG may be fluidly connected to receive a plurality of feed gas streams via a plurality of feed gas inlets. Combustion gas stream 304 may be admitted to the HRSG 400 via a gas inlet into a heating circuit of HRSG 400 to heat one or more heat exchange conduits before exiting via the gas outlet of HRSG 400 as a combustion gas stream 432 that has been cooled. Steam turbine 500 may be fluidly connected to receive via a plurality of inlets, a plurality of steam streams from HRSG 400.

In a first heat recovery steam generation and expansion loop, a feed stream 403 may be admitted to HRSG 400 at a high pressure via a high pressure feed inlet, generating steam at a first or high pressure in a heat exchange conduit 404, before exiting via a steam outlet as a first steam stream 512. Steam stream 512 may be admitted and expanded such as over a high pressure steam turbine 502, recovering energy from the expanding steam stream 512 before exiting via an outlet as a steam stream 522. In one embodiment, the first expanded steam stream 522 may be combined with a second steam stream 514 from the HRSG 400. In a second heat recovery steam generation and expansion loop, a second feed stream 405 may be admitted to HRSG 400 at an intermediate pressure via a second feed inlet, generating steam at a second or intermediate pressure in a heat exchange conduit 406, before exiting via a steam outlet as a second steam stream 514. Steam stream 514 may be admitted and expanded such as over an intermediate pressure steam turbine 504, recovering energy from the expanding steam stream before exiting via an outlet as a steam stream 524. In one embodiment, second expanded steam stream 524 may be combined with a third steam stream 516 from the HRSG 400. In a third heat recovery steam generation and expansion loop, a third feed stream 407 may be admitted to HRSG 400 at a low pressure via a feed inlet, generating steam at a third or low pressure in a heat exchange conduit 408, before exiting via a steam outlet as a third steam stream 516. Steam stream 516 may be admitted and expanded such as over a low pressure steam turbine 506, recovering energy from the expanding steam stream before exiting via an outlet as a steam stream 526. A water separator, for example, a condenser or cooler (not shown in FIG. 1), may be fluidly connected via an inlet to receive steam stream 526 from steam turbine 500, to separate and recover the water component in steam stream 526. The recovered water component may be used in integrated adsorptive gas separation system 100, for example, recycled as a water source for feed streams 403, 405 and 407.

In one embodiment, feed streams 403, 405, and 407 may comprise water streams supplied at high, intermediate, and low pressures, respectively, from at least one of an external source and/or an internal source from integrated adsorptive gas separation system 100. The expansion of steam streams 512, 514 and 516 in the expansion turbines of steam turbine 500 converts the energy within the steam into mechanical energy, which may be used drive one or more various mechanical devices (not shown in FIG. 1) including, for example, an electric generator, a gas compressor or a pump connected to steam turbine 500.

Typically steam generated for a heat recovery steam generation and expansion loop or a steam turbine is desirably high in quality. The quality of a steam stream may typically be quantified as the energy content (for example, temperature and pressure) and level of contaminants (for example, dissolved solids, pH, etc.) in a steam stream, where a high quality steam may comprise high temperature, high pressure, and low levels of contaminants. A steam stream with relatively lower quality, for example, less energy and higher levels of contaminants, compared to a steam stream generated for a steam turbine, may be acceptable to desorb the adsorbed gas such as carbon dioxide from the adsorbent material in a gas separation system and may be generated by an auxiliary heat exchanger and auxiliary heat exchange conduit.

In another embodiment an integrated adsorptive gas separation system 100 further comprises an auxiliary heat exchanger having a heating circuit fluidly connected to receive at least a portion of a heating fluid stream as a source of heat, and an auxiliary heat exchange conduit fluidly connected to receive a desorption fluid feed stream and converting the desorption fluid feed stream by heating into a desorption fluid stream, such as for use in desorption of adsorbed gases from an adsorbent material within an adsorbent contactor in an adsorptive gas separation system 200, for example. The heating fluid may be a gas or liquid, for example, a hot process liquid stream, a hot process gas stream, or a combustion gas stream from a fuel combustor, such as gas turbine 300. In one embodiment, an adsorptive gas separator system 200 is fluidly connected to receive a combustion gas stream from an exhaust outlet of the prime mover (such as gas turbine fuel combustor 300) into an inlet of at least one adsorbent contactor, to adsorb at least a portion of the carbon dioxide component onto at least one adsorbent material. The adsorptive gas separator system is also fluidly connected to receive a desorption fluid stream from the auxiliary heat exchange conduit of the auxiliary heat exchanger into the inlet of at least one adsorbent contactor, to desorb at least a portion of the carbon dioxide component on at least one adsorbent material comprised in the adsorbent contactor. The adsorptive gas separator system 200 is also fluidly connected to receive a conditioning fluid stream into the inlet of at least one adsorbent contactor to desorb at least a further portion of the carbon dioxide component on at least one adsorbent material to recover a third product stream. A third product stream conduit may be fluidly connected to receive the third product stream from an outlet of at least one adsorbent contactor, and to recycle the third product stream to the prime mover via the oxidant inlet. In one embodiment the desorption fluid feed stream may be admitted into an auxiliary heat exchange conduit of the auxiliary heat exchanger preferably at a pressure of less than about 2 bar above ambient and more preferably at a pressure less than about 1 bar above ambient. The heating circuit of the auxiliary heat exchanger may be fluidly connected to a gas or liquid stream source and may be located downstream from an optional HRSG.

In another embodiment of the present invention, an integrated adsorptive gas separation process also comprises admitting at least a portion of a heating fluid into a heating circuit of an auxiliary heat exchanger to heat an auxiliary heat exchange conduit, admitting a desorption fluid feed stream into the auxiliary heat exchange conduit to convert the desorption fluid feed stream by heating into a desorption fluid stream, and admitting the desorption fluid to desorb at least a portion of the carbon dioxide component adsorbed on at least one adsorbent material in at least one adsorbent contactor. The heating fluid may be a gas or liquid, for example, a hot process liquid stream, a hot process gas stream, or a combustion gas stream from a fuel combustor. The desorption fluid feed stream is admitted into auxiliary heat exchange conduit preferably at a pressure less than about 2 bar above ambient or more preferably at a pressure less than about 1 bar above ambient. This may desirably reduce the energy required to produce and supply the desorption fluid resulting in reducing the operating cost of the adsorptive gas separation system.

Referring again to FIG. 1, in one embodiment an auxiliary heat exchanger 430 may comprise a gas inlet, a gas outlet, a feed inlet, a steam outlet, and at least one auxiliary heat exchange conduit 411, where auxiliary heat exchanger 430 is fluidly connected to receive via a gas inlet, at least one of combustion gas stream 432 from HRSG 400, and a combustion gas stream 304 from gas turbine 300. Auxiliary heat exchange conduit 411 is fluidly connected to receive via a feed inlet a desorption fluid feed stream 409 via a first condensate stream 228 from a combustion gas cooler 220 and a second condensate stream 242 from a gas compression system 240. Further cooled combustion gas stream 432 may be admitted via the gas inlet of auxiliary heat exchanger 430, transferring heat to auxiliary heat exchange conduit 411 before exiting via the gas outlet of heat exchanger 430 as a combustion gas stream 410. Desorption fluid feed stream 409 may be admitted to auxiliary heat exchanger 430 at very low pressure, for example, at substantially ambient pressure or slightly above ambient via a feed inlet, generating steam at a fourth or very low pressure in auxiliary heat exchange conduit 411 before exiting via a steam outlet as a steam stream or a desorption fluid stream 214.

In one embodiment, a steam stream generated at a very low pressure in auxiliary heat exchange conduit 411 may desirably be supplied to an adsorptive gas separation system 200 via a steam outlet without passing through an expansion turbine. Auxiliary heat exchange conduit 411 may desirably be configured to provide a supply of steam at a relatively lower pressure than the rest of the HRSG 400, such as may be suitable only for low pressure use in adsorptive gas separation system 200 which preferably operates at substantially ambient pressure or only slightly above, for example. The very low pressure steam stream provided from the exemplary auxiliary heat exchange conduit 411 may desirably be used to provide a desorption fluid or a steam purge fluid such as for use in desorption of carbon dioxide from the one or more adsorbers of the adsorptive separation system, such as for desorption of carbon dioxide, producing a product stream for recycle to the fuel combustor for combustion, as described above in reference to other embodiments of the invention. Desorption fluid feed stream 409 may be a substantially water stream, preferably at least a portion recovered from combustion gas cooler 220 and first condensate stream 228. Alternatively, Desorption fluid feed stream 409 can be supplied from a source (not shown in FIG. 1) external to integrated adsorptive gas separation system 100.

Figure 2:
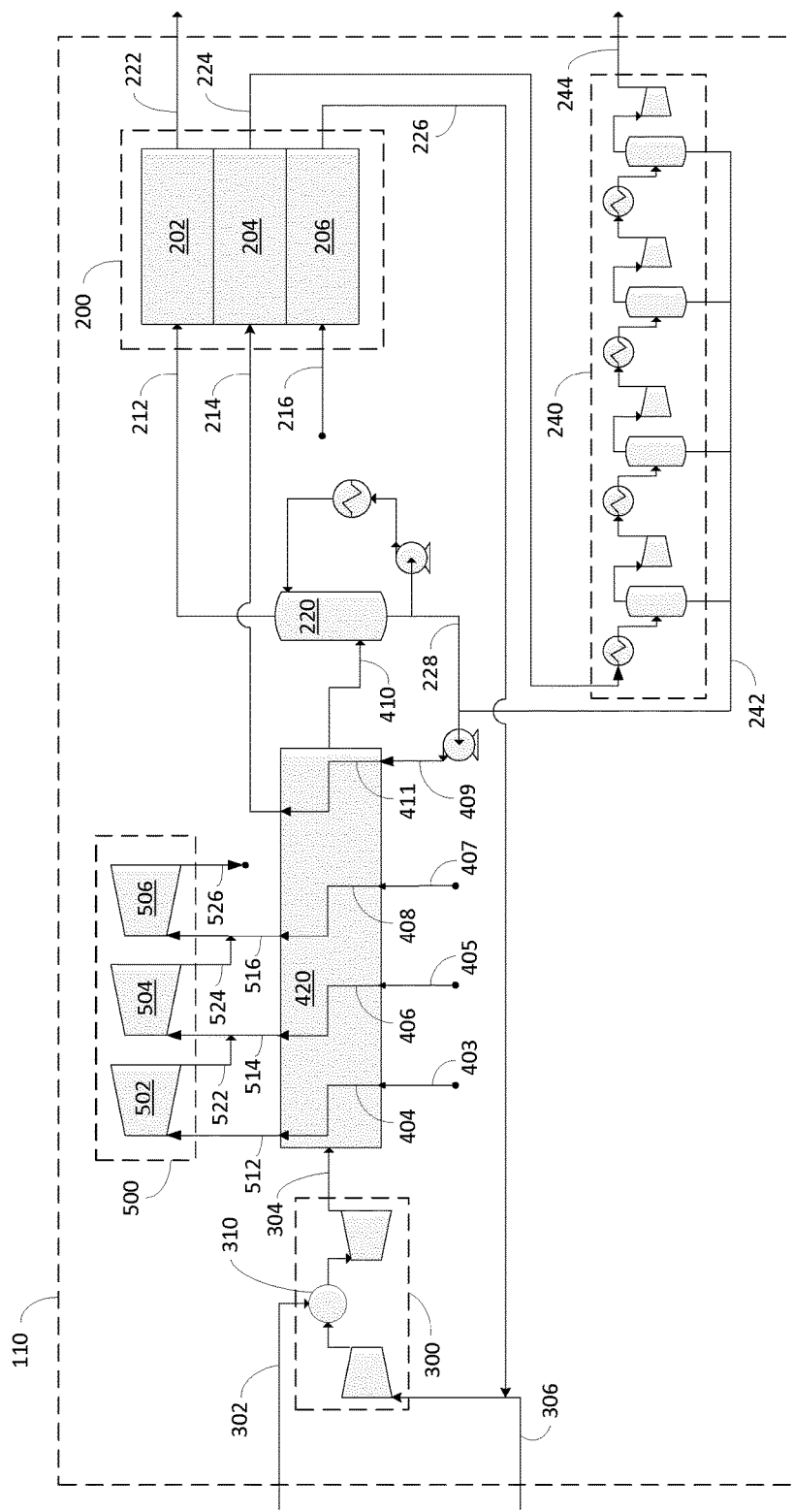
FIG. 2 is a schematic diagram illustrating an integrated adsorptive gas separation system according to a further embodiment of the invention, comprising a gas turbine, a heat recovery steam generator (HRSG), a steam turbine, a combustion gas cooler, an adsorptive gas separation system, a gas compression system and an auxiliary heat exchanger integrated into the HRSG.

In another embodiment, an auxiliary heat exchanger or auxiliary heat exchange conduit 411 that supplies a steam stream to an adsorptive gas separator for desorption may be integrated into a primary heat recovery steam generator 420. FIG. 2 illustrates an integrated adsorptive gas separation system 110 which is substantially similar to the integrated adsorptive gas separation system 100 in FIG. 1 with the following exceptions. In the system 110 of FIG. 2, auxiliary heat exchange conduit 411 is integrated into the HRSG 420, thereby replacing and eliminating combustion gas stream 432 and heat exchanger 430 shown in FIG. 1. In other aspects, the integrated adsorptive gas separation system 110 of FIG. 2 is substantially similar to the system 100 illustrated in FIG. 1 and described in detail above.

The generation and use of a lower quality steam stream, at very low pressure, with relaxed contaminant specifications for desorption of carbon dioxide from the adsorbent material of adsorptive gas separation system 200 may be desirable compared to using a high quality grade of steam desired by a steam turbine. Some of the benefits may include, for example, increasing the efficiency of the integrated adsorptive gas separation system by reducing or replacing the use of steam generated for a steam turbine, and enable recycling of condensate collected from the integrated adsorptive gas separation system which may enable the integrated adsorptive gas separation system to operate substantially independently from an external water supply for steam generation during normal operation.

Integrated adsorptive gas separation systems 100 and 110 also comprise a combustion gas cooler 220, such as a direct contact combustion gas cooler, having a gas inlet and a gas outlet where combustion gas cooler 220 is fluidly connected via the gas inlet to receive combustion gas stream 410 cooled from auxiliary heat exchanger 430 or HRSG 420. Combustion gas cooler 220 cools combustion gas stream 410, before exiting via an outlet as combustion gas stream 212. Combustion gas cooler 220 separates and recovers the water component contained in combustion gas stream 410.

Adsorptive gas separation system 200 comprises one or more adsorptive contactors, each comprising at least one suitable adsorbent material, such as suitable for adsorption of at least a portion of carbon dioxide comprised in a combustion gas stream. Suitable flow diverting and/or flow control devices, for example, valves and/or diverters (not shown in FIG. 1), may be used to control and/or cycle fluid streams admitted into the one or more adsorptive contactors in an adsorptive gas separation system 200. In one embodiment, adsorptive gas separation system 200 may comprise at least three adsorptive contactors 202, 204 and 206 in an arrangement where each of the adsorptive contactors may be fluidly connected to receive a separate fluid stream at a given time, for example. Adsorptive gas separation system 200 is fluidly connected to receive combustion gas stream 212 via an inlet from combustion gas cooler 220, fluidly connected to receive a desorption fluid stream 214 from auxiliary heat exchange conduit 411 and auxiliary heat exchanger 430 (shown in FIG. 1) or HRSG 420 (shown in FIG. 2), and fluidly connected to receive a conditioning stream 216, for example, an air stream, from a conditioning stream source (not shown in FIGS. 1 and 2) which may be ambient air, or another suitable conditioning stream, such as heated air, steam, or heated process fluid, for example.

FIG. 1 illustrates adsorptive gas separation system 200 in a first sequence. The positions of adsorptive contactors 202, 204, and 206 can be altered, depending on the desired step of each contactor. In subsequent second and third sequences (not shown in FIG. 1), contactors 202, 204, and 206 may be positioned in alternative positions. In a first sequence contactor 202 is positioned to receive combustion gas stream 212 for an adsorption step, contactor 204 is positioned to receive a steam stream or desorption fluid stream 214 in a first desorption step, and contactor 206 is positioned to receive a conditioning stream 216 in a second desorption step. Each adsorbent contactor can be continuously or repeatedly cycled sequentially between the adsorption, first desorption, and second desorption steps. The depicted adsorptive contactors 202, 204, and 206, may each comprise single or multiple contactors sequentially undergoing the depicted steps.

Combustion gas stream 212 may be admitted into contactor 202 for adsorption of at least a portion, and preferably substantially all of the carbon dioxide component of the combustion gas stream on the adsorbent material of contactor 202, to recover a first product stream 222 depleted in carbon dioxide. In one embodiment, first product stream 222 may desirably be substantially free of carbon dioxide, such as for release to the environment. Contactor 204 may desorb a first portion of adsorbed carbon dioxide from the adsorbent material of contactor 204, such as by heating of the adsorbent material. In one embodiment, the first portion of carbon dioxide may be desorbed by heating the adsorbent material through the admission of a desorption fluid stream 214 via an inlet, to recover a second product stream 224 desirably enriched in carbon dioxide relative to the combustion gas stream, via an outlet. In an alternative embodiment, a hot combustion gas stream, sourced downstream from a fuel combustor, or preferably downstream from a fuel combustor and upstream of a gas separation system, or more preferably downstream from a fuel combustor and upstream of a combustion gas cooler, may be used to desorb and/or purge the first portion of adsorbed carbon dioxide. In further optional embodiment, the second portion of carbon dioxide adsorbed on the adsorbent material may optionally be desorbed by a hot combustion gas stream, for example, sourced downstream from gas turbine 300, or downstream from gas turbine 300 and upstream from adsorptive gas separation system 200, or downstream from gas turbine 300 and upstream from combustion gas cooler 220. In one such embodiment, the second product stream may comprise substantially pure carbon dioxide and/or substantially carbon dioxide and steam (or other suitable fluid for desorption), which may be desirably be suitable to be efficiently compressed such as for use and/or storage such as for carbon sequestration or alternate use in enhanced oil recovery, for example. Contactor 206 may receive a conditioning stream 216, via an inlet and a oxidant source (not shown in FIG. 1) such as to desorb a second portion of carbon dioxide from the adsorbent material in contactor 206, to recover and recycle a conditioning fluid stream or a third product stream 226 enriched in carbon dioxide via an outlet. In one embodiment, the recovery of the first product stream, second product stream and third product stream may occur substantially simultaneously.

In another embodiment, integrated adsorptive gas separation system 100 also comprises gas turbine fuel combustor 300 which may be fluidly connected to receive at least a portion of third product stream 226 from adsorptive gas separation system 200 via a third product stream conduit (not shown in FIG. 1) and an oxidant inlet of gas turbine fuel combustor 300. Third product stream 226 may be recycled to gas turbine fuel combustor 300 via the oxidant inlet to be used as at least a portion of the oxidant passing into gas turbine fuel combustor 300 during operation. In one embodiment, an adsorbent material that selectively adsorbs carbon dioxide may be used in the adsorptive gas separation system 200, which may provide for producing a substantially contaminant free carbon dioxide stream during the desorption step, for example, which may be substantially free of nitrogen oxides and/or sulfur oxides. Recycling of a substantially contaminant free third product stream to a fuel combustor may be desirable compared to a conventional exhaust gas recirculation process where a combustion gas stream from a combustor is recycled without removing at least a portion of the nitrogen oxides and/or sulfur oxides from the combustion gas stream. In such an embodiment, the use of an oxidant stream to desorb and recover the third product stream may provide for a greater concentration of the carbon dioxide component of the second product stream compared to the concentration of the carbon dioxide component of the third product stream.

In one embodiment, the first adsorbent contactor 202 may preferably adsorb substantially all of the carbon dioxide component of combustion gas stream 212, resulting in a first product stream 222 recovered from an outlet of adsorptive gas separation system 200 that is substantially free of carbon dioxide. In an exemplary embodiment, the first portion of carbon dioxide desorbed from second contactor 204 may desirably comprise only a portion and in a preferred embodiment no more than half of the total carbon dioxide adsorbed during an adsorption step, and more desirably may comprise about one third of the total carbon dioxide adsorbed during an adsorption step. Accordingly, then, in one embodiment the second portion of carbon dioxide desorbed from contactor 206 may desirably comprise no less than half of the total carbon dioxide adsorbed during an adsorption step, and more preferably about two thirds of the total carbon dioxide adsorbed during an adsorption step. In one embodiment, the desorption of preferably no less than half, and more preferably about two thirds of the total carbon dioxide adsorbed during an adsorption step and recycle of the third product stream 226 back to gas turbine fuel combustor 300 may desirably increase the concentration of carbon dioxide in the combustion gas streams 304, 432, 410 and 212 delivered to adsorptive gas separation system 200, thereby increasing the efficiency of carbon dioxide adsorption in contactor 202 and also increase the efficiency of desorption of the first portion of carbon dioxide in contactor 204, thereby increasing the energy efficiency of adsorptive gas separation system 200 and decreasing the cost of producing first product stream 222 and second product stream 224, depleted and enriched in carbon dioxide, respectively.

For example, an integrated gas separation process using a natural gas stream as a fuel stream for a fuel combustor where a product stream recovered from a gas separation device is admitted to the fuel combustor via an oxidant inlet may desirably increase the carbon dioxide component of the combustion gas stream produced by the fuel combustor to a concentration greater than about 4%, or preferably greater than about 6%, or more preferably greater than about 10%, or even more preferably greater than about 20%. In another example, an integrated gas separation process using coal as a fuel for a fuel combustor where a product stream recovered from a gas separation device is admitted to the fuel combustor via an oxidant inlet may desirably increase the carbon dioxide component of the combustion gas stream produced by the fuel combustor to a concentration greater than about 15.5%, or preferably greater than about 18%, or more preferably greater than about 20%, or even more preferably greater than about 25%. Further, the recycle of carbon dioxide and air contained in third product stream 226 back to gas turbine fuel combustor 300 via the oxidant inlet may also have the benefit of reducing the temperature of the combined oxidants used for combustion, due to the decrease in temperature of the oxidants from the heat of desorption of the second portion of carbon dioxide, thereby increasing the efficiency of a gas turbine fuel combustor 300. The efficiency of the compression stage of gas turbine fuel combustor 300 may also be desirably increased due to the cooler oxidant stream and the increased heat capacity of carbon dioxide (relative to if only air was supplied) in the third product stream 226 admitted into the oxidant compressor of gas turbine fuel combustor 300.

In one embodiment, integrated adsorptive gas separation system 100 as illustrated in FIG. 1 may also comprise a gas compression system 240, having a gas inlet, a gas outlet, and a condensate outlet where gas compression system 240 is fluidly connected to receive via the gas inlet a product stream, for example, second product stream 224 enriched in carbon dioxide, from adsorptive gas separation system 200. The gas compression system 240 may desirably comprise a carbon dioxide compression train system suitable to compress the second product stream enriched with carbon dioxide, such as through a series of sequential compression stages with intercoolers and optional condensers between the compression stages, to provide a highly pressurized and/or liquefied concentrated carbon dioxide product stream such as for export to other industrial and/or sequestration uses, such as sequestered storage and/or enhanced oil recovery, for example. The compressed second product stream may be exhausted via an outlet of gas compression system 240 as a high pressure carbon dioxide stream 244. The water component contained in the second product stream may be separated for example, by condensers, and recovered, exiting via condensate outlet of compression system 240 as second condensate stream 242. In certain applications according to a particular embodiment, for example, electric power generation with enhanced oil recovery, an integrated adsorptive gas separation system may be located in close proximity to an oil field, generating and supplying electric power to an electrical grid and injecting a high pressure carbon dioxide stream into an oil field.

In another embodiment, one or more heat exchange conduit of a HRSG or an auxiliary heat exchanger may be fluidly connected to receive one or more condensate streams at an elevated pressure and/or temperature from one or more condensers of a compression system, as at least a portion of a feed stream and/or desorption fluid feed stream. In a compression system having multiple compressor stages in series, employing a plurality of intercoolers and condensers between the stages, the plurality of condensers may be fluidly connected to supply a plurality of interstage condensate streams to a plurality of heat exchange conduits of a HRSG at a plurality of pressures. Optionally, the plurality of condensers may be fluidly connected to the plurality of heat exchange conduits individually or a combination of individually and combined. Fluidly connecting the condensers of the compression system to the heat exchange conduit may desirably increase the efficiency of the integrated adsorptive gas separation system and process by employing at least a portion of the pressure and/or heat generated in the compression system for generating at least a portion of steam in a HRSG or auxiliary heat exchanger.

In another embodiment an integrated adsorptive gas separation system may be operated by admitting an oxidant stream and a fuel stream into a fuel combustor to produce a combustion gas stream comprising at least carbon dioxide, and water components. The combustion gas stream may be admitted into an auxiliary heat exchanger to transfer heat to auxiliary heat exchange conduit, before being admitted into a combustion gas cooler where at least a portion of the water component in the combustion gas stream is separated, forming a first condensate stream that may be recovered. The combustion gas stream may then be admitted into a gas separation system where at least a portion of the carbon dioxide component contained in the combustion gas stream may be adsorbed on at least one adsorbent material. The substantially carbon dioxide depleted gas stream may be exhausted from the gas separation system as a first product stream. The heat exchange conduit in the auxiliary heat exchanger may generate a desorption fluid stream, for example, a steam stream, that may be selectively admitted into the gas separation system where at least a portion of the carbon dioxide component adsorbed on at least one adsorbent material is desorbed creating a substantially carbon dioxide and steam stream or second product stream. The second product stream may be admitted into a water separator, for example, a cooler or condenser, where at least a portion of the water component in the second product stream is separated, forming a second condensate stream which may be recovered. The first and/or second condensate streams may be admitted into the auxiliary heat exchange conduit. In one embodiment, the first condensate stream may be recovered at an amount equal to or greater than an amount sufficient for desorbing at least a first portion of the carbon dioxide component adsorbed on the adsorbent material of an adsorbent contactor. Alternatively, the first condensate stream and the second condensate stream may be recovered at an amount equal to or greater than an amount sufficient for desorbing at least a first portion of the carbon dioxide component adsorbed on the adsorbent material of an adsorbent contactor. Condensing and recovering the first and second condensate stream may allow the integrated adsorptive gas separation system to operate substantially without an external water source. This may desirably enable an integrated adsorptive gas separation system to operate at a location where a supply of water is limited, and/or reduce the operating cost of the integrated adsorptive gas separation system by reducing the consumption and cost of externally supplied water.

In a particular embodiment adapted to adsorptive gas separation of combustion gas from a combined cycle natural gas power generation turbine, such as the integrated adsorptive gas separation of carbon dioxide from combustion gas, the adsorptive gas separation system may desirably desorb about one third of the carbon dioxide adsorbed on a contactor to recover a second product stream which may be enriched with carbon dioxide or substantially comprise carbon dioxide, and desorb about two thirds of the carbon dioxide adsorbed on a contactor to recover a third product stream which may be recycled back to the gas turbine for combustion. In one such embodiment where the third product stream comprises approximately two thirds of the carbon dioxide adsorbed on an adsorbent contactor, and where the third product stream is recycled to the gas turbine for combustion, the concentration or content of carbon dioxide in the combustion gas stream exhausted from a combustor, including for example, a gas turbine may be desirably controlled to contain about 12% carbon dioxide, wherein approximately one third of the carbon dioxide contained in the combustion gas stream (or approximately 3%-4% carbon dioxide content out of the 12% carbon dioxide content in the combustion gas stream) is recovered in the second product stream (such as for sequestration and/or industrial use, for example) and approximately two thirds of the carbon dioxide contained in the combustion gas stream (or approximately 7%-8% carbon dioxide content out of the 12% carbon dioxide content in the combustion gas stream) is recycled back to the gas turbine for combustion. In alternative embodiments, the concentration of carbon dioxide in the combustion gas stream of a gas turbine may be desirably controlled to contain substantially higher than 12% carbon dioxide, for example, in gas turbines which are suitably configured for such carbon dioxide concentrations, such as may provide further benefits such as to further increase efficiency of adsorptive separation of carbon dioxide in the adsorption system, and/or increase efficiency of the turbine and/or heat recovery processes, for example.

In one embodiment, an integrated gas separation process may comprise admitting a natural gas stream as a fuel stream, an oxidant stream and a third product stream into a fuel combustor that during operation of the fuel combustor produces a combustion gas stream having a carbon dioxide concentration greater than about 4%, or preferably greater than about 6% or more preferably greater than about 10% or even more preferably greater than about 20%. The oxidant stream admitted into the fuel combustor may be an air stream, but in an alternative embodiment may comprise one or more other suitable oxidant streams, for example, an air stream supplemented with oxygen, an enriched oxygen stream, an oxidant stream containing less oxygen than the ambient air, and/or an oxidant stream with exhaust gas recirculation.

In another embodiment, an integrated gas separation process may comprise admitting coal as a fuel, an oxidant stream and a third product stream into a fuel combustor, for example, a boiler that during operation of the fuel combustor produces a combustion gas stream having a carbon dioxide concentration greater than 15.5%, or preferably greater than 18% or more preferably greater than 20% or even more preferably greater than 25%. The oxidant stream admitted into the fuel combustor may be an air stream, but in an alternative embodiment may comprise one or more other suitable oxidant streams, for example, an air stream supplemented with oxygen, an oxidant stream containing less oxygen than the ambient air, and/or an oxidant stream with exhaust gas recirculation.

FIG. 3 is a graph illustrating a computer simulated model of various operating plots along various operating points of an exemplary integrated carbon dioxide gas separation system implementing an exemplary integrated carbon dioxide gas separation process incorporating a gas turbine, according to an embodiment of the present invention. In such an embodiment, the integrated carbon dioxide gas separation system comprises an exemplary gas turbine fuel combustor employing natural gas as a fuel, air as an oxidant and recycling of a carbon dioxide enriched stream to the oxidant inlet of the gas turbine. The fuel flow, inlet temperature of the expansion turbine within the gas turbine, and the concentration of the carbon dioxide recovered from the integrated carbon dioxide gas separation system, for example, carbon dioxide concentration of a second product stream, remained substantially constant. The x-axis of the graph shown in FIG. 3 is representative of specific operating points where an operating point 1 has the most carbon dioxide recycled to the gas turbine (simulating a third product stream admitted into the oxidant inlet of the turbine) and an operating point 17 having the least carbon dioxide recycled to the gas turbine. Plot 601 illustrates the molar flow of air admitted to the gas turbine. Plot 602 illustrates the mole fraction of oxygen of the oxidant stream admitted to the gas turbine. Plot 603 illustrates the carbon dioxide concentration of the combustion gas stream produced by the gas turbine. Plot 604 illustrates the mole fraction of carbon dioxide of the oxidant stream admitted to the gas turbine. Plot 605 illustrates the heat capacity of the combustion gas stream produced by the gas turbine. Plot 606 illustrates the power output of the example integrated carbon dioxide gas separation system. In one embodiment, FIG. 3 may illustrate how changes to the mole fraction of carbon dioxide of the oxidant stream admitted to the gas turbine modeled in the exemplary computer simulated integrated carbon dioxide gas separation system shown may affect the carbon dioxide concentration and heat capacity of the combustion gas stream, and the power output of the integrated carbon dioxide gas separation system.

FIG. 4 illustrates a schematic view of an exemplary integrated gas separation system 700 for separation of combustion gases from a fuel combustor according to an embodiment of the invention, and for use in accordance with process embodiments of the present invention. In one embodiment, the integrated gas separation system 700 may be used for implementing the present integrated carbon dioxide gas separation process described herein. During operation of integrated gas separation system 700, a fuel stream 702 (typically natural gas comprising primarily methane, but may include any other suitable gaseous, vapor, liquid, solid, or airborne combustible fuel) may be admitted via a fuel inlet for admixture with a mixed oxidant stream 710 admitted into a fuel combustor 704 via an oxidant inlet, producing a combustion gas stream 712 comprising at least carbon dioxide and water components. Combustion gas stream 712 may be divided into a combustion gas stream 718 and an optional bleed stream 716. Gas separation system 708 is fluidly connected to receive via an inlet, a combustion gas stream 718 from the combustion gas stream 712 exhausted from an exhaust outlet of fuel combustor 704, and separates at least a portion of the carbon dioxide component from combustion gas stream 718.

In one embodiment, gas separation system 708 may employ a sorptive gas separation process such as an adsorption and/or absorption gas separation process; in an alternative embodiment, gas separation system 708 may employ any one or more suitable gas separation processes including but not limited to a chemical absorption gas separation process (for example, using amine-based solvent and/or amine impregnated absorbent support materials), and/or membrane gas separation process (for example, using zeolite or ceramic membranes), and/or an adsorptive gas separation process (for example using known adsorbent materials).

In one embodiment, as combustion gas stream 718 flows through gas separation system 708, the carbon dioxide component may be adsorbed on at least one adsorbent material within gas separation system 708, such as within at least one adsorbent contactor, producing heat from the heat of adsorption and a flue gas stream 714 that may be depleted in the carbon dioxide component relative to combustion gas stream 712. In one embodiment, the gas separation process may desirably result in substantially all of the carbon dioxide component of the combustion gas stream being adsorbed and separated so that flue gas stream 714 recovered from gas separation system 708 may desirably be substantially free of carbon dioxide. Flue gas stream 714 may be recovered via an outlet from gas separation system 708 and exhausted from integrated gas separation system 700 to the ambient air, for example. At least a portion of the heat released from the heat of adsorption may be used for desorbing the carbon dioxide component from the adsorbent material. For example, in a gas separation system, a first contactor may be performing an adsorption step while a second contactor may be performing a desorption step, the heat of adsorption from the first contactor may be conveyed and used in the desorption of the carbon dioxide component in the second contactor.

In one embodiment, an oxidant stream 706, such as comprising at least one of an air stream, an air stream supplemented with oxygen, a substantially oxygen stream, an oxidant stream containing less oxygen than the ambient air for example, and combustion gas stream 718 may be admitted into gas separation system 708 via respective inlets to desorb at least a portion of the carbon dioxide component on the adsorbent material and optionally condition the adsorbent material for the adsorption process, producing a mixed oxidant stream 710 enriched in carbon dioxide. According to one embodiment, at least periodically, substantially all of the desorbed carbon dioxide component may be recovered from gas separation system 708 by mixed oxidant stream 710, such as by an exemplary displacement purge of the adsorbent material and/or adsorbent contactors of the gas separation system 708, for example. Fuel combustor 704 via an oxidant inlet and a mixed gas conduit (not shown in FIG. 4) is fluidly connected to receive at least a portion of mixed oxidant stream 710, at least periodically, as an oxidant stream from an outlet of the gas separation system. Optionally, a portion of the oxidant stream supplied to fuel combustor 704 may be fluidly connected to and supplied by an oxidant source, without flowing through a gas separation system. In one such example, fuel combustor 704 may be fluidly connected to receive a portion of oxidant stream 706 via gas separation system 708 and mixed oxidant stream 710, and to receive a portion of oxidant stream 706 (not shown in FIG. 4) directly, without flowing through gas separation system 708. As mixed oxidant stream 710 may be enriched in carbon dioxide, combustion gas stream 712 and combustion gas stream 718 produced by fuel combustor 704, may also desirably be enriched in carbon dioxide or have an elevated concentration of carbon dioxide compared to a fuel combustor that employs solely air as an oxidant, which may desirably increase the efficiency of adsorptive gas separation system 708. Optionally at least a portion of combustion gas stream 712 may be recovered at least periodically from integrated gas separation system 700 as optional bleed stream 716 via an enriched carbon dioxide conduit (not shown in FIG. 4) which may be fluidly connected to a combustion gas conduit. The molar quantity of carbon recovered from integrated gas separation system 700 and bleed stream 716 may be preferably at a rate about equal to the molar quantity of carbon of the fuel stream admitted into fuel combustor 704 via a fuel inlet. Combustion gas stream 712 and combustion gas stream 718 when enriched with carbon dioxide may also desirably allow for desorption of the adsorbent material with a reduced quantity or more preferably substantially without the use of a desorption fluid, for example, a steam stream, which may desirably reduce the energy consumed during desorption of the adsorbent materials or gas separation system further resulting in improved efficiency and reduced capital and/or operating costs of the integrated gas separation system 700.

In an alternative aspect, an integrated adsorptive gas separation process according to an embodiment of the invention may comprise a temperature swing adsorption (TSA) process particularly directed to separating carbon dioxide from a combustion gas stream from a fuel combustor, where in the combustion gas mixture comprises at least carbon dioxide and water components. The TSA process for separating carbon dioxide may be adapted for removing at least a portion of carbon dioxide from the combustion gas or exhaust of a thermal power plant, such as a coal or natural gas power plant for example, or from a steam generator/boiler or process heater. The desorption of only a portion of the carbon dioxide component adsorbed on a contactor during a first desorption step to be recovered in the second product stream may desirably have the benefit of increasing the concentration of carbon dioxide in the combustion gas exiting from the fuel combustor, such that carbon dioxide from the combustion gas in the adsorptive gas separation system may be more efficiently adsorptively separated such as by a TSA process. Optionally, the integrated adsorptive gas separation process may be based primarily on a pressure swing adsorption (PSA) and/or a partial pressure swing/displacement purge adsorption (PPSA) process, such as described above where TSA is not the primary adsorptive process but may comprise a secondary adsorptive driver, for example.

In one such embodiment, a TSA (or alternatively a PSA and/or PPSA) carbon dioxide gas separation process may desirably be repeated in each of multiple parallel passage adsorbent contactors in the adsorptive gas separation system to provide for a continuous or repeated cyclic separation method for separating a portion of the carbon dioxide component from the combustion gas stream, while recycling a portion of the carbon dioxide to the fuel combustor. In particular, similar to as described above, an adsorptive gas separation system may desirably comprise two or more such parallel passage adsorbent contactors, so as to provide for staggered and/or sequential operation (i.e. adsorption and desorption steps occurring at different times in different contactors) of a suitable TSA (or alternatively a PSA and/or PPSA) separation process and allow continuous and/or semi-continuous adsorptive separation from a combustion gas sourced from a fuel combustor. As described above, any suitable known adsorptive separation system using mechanical/pneumatic or other types of valves or other flow control devices for example may be used to implement the gas flows of the steps of the present TSA (or alternatively a PSA and/or PPSA) process, as are known in the art for systems comprising one, two, or three or more adsorbers containing adsorbent material.

Similar to as described above, in one embodiment, an adsorptive gas separation system suitable for implementing the carbon dioxide separation process comprises at least one parallel passage adsorbent contactor which each comprise a plurality of substantially parallel fluid flow passages oriented in a first axial direction between and inlet and outlet of the contactor in order to permit gas to flow through the contactor, and cell walls which comprise at least one carbon dioxide selective adsorbent material situated between and separating the fluid flow passages. Each suitable such parallel passage adsorbent contactor further comprises a plurality of axially continuous thermally conductive filaments oriented in the axial direction of the contactor and in direct contact with the at least one carbon dioxide adsorbent material comprised in the cell walls of the contactor. As described above, certain such parallel passage adsorbent contactor structures which may be suitable for use in implementing a TSA carbon dioxide separation process according to an embodiment of the present invention are described in the applicant's co-pending PCT international patent application filed as PCT/CA2010/000251, the contents of which are herein incorporated by reference as though they had formed part of this application as originally filed. The adsorptive gas separation system may be suitable for implementing a carbon dioxide separation process based primarily on a pressure swing and/or a partial pressure swing/displacement purge adsorption process, such as described above in reference to other embodiments where TSA is not the primary adsorptive process but may comprise a secondary adsorptive driver, for example.

In one embodiment of the present integrated adsorptive gas separation process, any suitable known carbon dioxide adsorbent material may be used in the adsorbent contactor(s) of the adsorptive gas separation system to adsorb carbon dioxide during the adsorption step of the process. Potentially suitable such carbon dioxide adsorbents may comprise, but are not limited to: activated carbon adsorbent, amine impregnated adsorbent supports (comprising silica, activated carbon, alumina, zeolite, polymer and ceramic supports), metal salt, metal hydroxide, metal oxide, zeolite, hydrotalcite, alkali promoted alumina, silicalite, metal organic framework and zeolitic imadazolate framework adsorbent materials, and combinations thereof. A suitable carbon dioxide adsorbent material may be selected that may also desirably be selective for the adsorption of carbon dioxide over any other gas components of the combustion gas stream, for example.

Similar to as described above, in one embodiment, the steps of a TSA (or alternatively or in combination with a PPSA) adsorptive gas separation process may be desirably conducted under substantially constant or isobaric pressure conditions. The admission of the combustion gas stream to the adsorbent contactor, adsorption of carbon dioxide component, recovery of a first product stream or carbon dioxide-depleted flue gas stream, desorption of a first portion of carbon dioxide adsorbed on an adsorbent material in a contactor, recovery of a second product stream, desorption of a second portion of carbon dioxide adsorbed on an adsorbent material in a contactor, and recovery of a third product stream may all be conducted under substantially atmospheric pressure, for example. Such steps of the present TSA (or alternatively or in combination with a PPSA) process may be conducted at a substantially constant elevated pressure, such as under isobaric super-atmospheric conditions, for example. The admitting, adsorbing of a combustion gas stream and recovering a first product stream steps of the present TSA (or alternatively or in combination with a PPSA) process may be conducted under a first substantially constant pressure condition, such as under atmospheric pressure, for example, while the desorbing and recovering a desorbed second product stream containing carbon dioxide, steps may be conducted at an elevated pressure, such as an elevated super-atmospheric pressure. In one embodiment, the adsorption separation system and/or adsorbent contactor may be substantially sealed prior to the desorbing step, and the heating of the adsorbent contactor conducted during the desorbing step may result in increased pressure within the adsorbent contactor as the adsorbed carbon dioxide desorbs from the adsorbent material, thereby raising the pressure of the contactor to a super-atmospheric level, for example. In this way the desorbed carbon dioxide product stream or second product stream may optionally be recovered at a desirably elevated pressure above the pressure at which the adsorbing steps were conducted, so as to provide a pressurized second product stream enriched in carbon dioxide which may be desirable in certain applications, such as where further compression of the carbon dioxide may be required for transport, storage, sequestration or industrial use. The desorbed second product stream enriched in carbon dioxide may be recovered from the inlet or outlet of the adsorptive gas separation system and/or adsorbent contactor.

In another embodiment, the adsorptive gas separation system may receive a combustion gas stream from a fuel combustor (such as from the exhaust of the HRSG for a combined cycle gas turbine, or from the turbine exhaust of a gas turbine without HRSG) at a pressure elevated above ambient pressure such as to provide sufficient pressure to supply and drive the combustion gas stream through an adsorptive gas separation system, for example. The combustion gas stream may be provided to the adsorptive gas separation system at a suitable super-atmospheric pressure such as approximately 10 kPa above ambient pressure, for example. The provision of combustion gas at a sufficiently elevated pressure to provide for driving the combustion gas stream through the adsorptive gas separation system may desirably allow for reduction and/or removal of auxiliary equipment such as a draft fan or other compressive equipment associated with the adsorptive gas separation system for moving the combustion gas stream through the adsorptive gas separation system, for example, which may desirably reduce the capital cost and/or energy consumption of the integrated adsorptive gas separation system and fuel combustor.

In a further embodiment, the present inventive integrated adsorptive gas separation process and system may be particularly adapted for integration with a natural gas combined cycle gas turbine power generator and comprise at least partial recycle of adsorbed carbon dioxide from the combustion gas stream back into the gas turbine, as may be envisioned with other gas separation techniques which may be known in the art.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the scope thereof. Accordingly, the scope of the invention is to be construed in accordance with the substance defined by the following claims.

What is claimed is:

1. An integrated adsorptive gas separation process for separating at least a portion of a combustion gas stream from a fuel combustor, said combustion gas stream comprising at least carbon dioxide and water components, the process comprising:
   (a) admitting a fuel stream to a fuel inlet and an oxidant stream to an oxidant inlet of said fuel combustor to produce said combustion gas stream;
   (b) admitting said combustion gas stream into an adsorptive gas separation system having a plurality of adsorbent contactors, each comprising at least one adsorbent material for adsorbing said carbon dioxide component;
   (c) admitting said combustion gas stream into an inlet of at least one adsorbent contactor;
   (d) adsorbing at least a portion of said carbon dioxide component of said combustion gas stream on at least one said adsorbent material;
   (e) recovering a first product stream depleted in said carbon dioxide component relative to said combustion gas stream from an outlet of at least one said adsorbent contactor;
   (f) desorbing a first portion of said carbon dioxide component adsorbed on at least one said adsorbent material in at least one said adsorbent contactor;
   (g) recovering a second product stream enriched in said carbon dioxide component relative to said combustion gas stream from at least one of said inlet and outlet of at least one said adsorbent contactor;
   (h) desorbing a second portion of said carbon dioxide component adsorbed on at least one said adsorbent material;
   (i) recovering a third product stream comprising said second portion of said carbon dioxide component from at least one of said inlet and outlet of at least one said adsorbent contactor; and
   (j) admitting at least a portion of said third product stream to the oxidant inlet of said fuel combustor for combustion.

2. The process of claim 1 further comprising in step (f) admitting a desorption fluid stream into at least one said adsorbent contactor in a quantity sufficient to desorb a portion of said total carbon dioxide component adsorbed on at least one said adsorbent material.

3. The process of claim 2 wherein said desorption fluid stream comprises at least one of: a steam stream, a hot combustion gas stream, an air stream and a heated air stream.

4. The process of claim 1 further comprising in step (h) admitting a conditioning stream into at least one said adsorbent contactor in a quantity sufficient to desorb at least a portion of said carbon dioxide component adsorbed on at least one said adsorbent material.

5. The process of claim 4 wherein said conditioning stream comprises at least one of: an air stream, a heated air stream, a flue gas stream, and a steam stream.

6. The process of claim 1 wherein said adsorptive gas separation system comprises at least three adsorbent contactors, and wherein said recovery of said first product stream, said second product stream and said third product stream from said adsorptive gas separation system occur substantially simultaneously in a first, second and third adsorbent contactor, respectively.

7. The process of claim 1 wherein steps (c) through (j) occur sequentially in one adsorbent contactor.

8. The process of claim 1 wherein step (f) further comprises terminating the flow of said combustion gas stream into said inlet of at least one said adsorbent contactor having at least one said adsorbent material prior to said desorbing said second product stream.

9. The process of claim 1 wherein said first product gas is substantially free of carbon dioxide, and said second product gas consists substantially of carbon dioxide.

10. The process of claim 1 wherein said third product stream is at a temperature above the ambient air temperature.

11. The process of claim 1 wherein said third product stream is at a temperature below the ambient air temperature.

12. The process of claim 9 wherein said third product stream comprises water.

13. The process of any one of claims 1-12 wherein said oxidant stream comprises air.

14. The process of any one of claims 1-12 wherein said oxidant stream comprises an oxygen concentration lower than the ambient air.

15. The process of any one of claims 1-12 wherein said oxidant stream comprises air supplemented with oxygen.

16. The process of any one of claims 2-15 further comprising:
heating said desorption fluid stream in an auxiliary heat exchanger conduit by means of a heating fluid admitted to said auxiliary heat exchanger,
wherein a desorption fluid feed stream is admitted into said auxiliary heat exchange conduit at a pressure less than about 2 bar above ambient.

17. The process of claim 16 wherein said pressure is less than about 1 bar above ambient.

18. The process of any one of claims 16-17 wherein said heating fluid is a gas.

19. The process of any one of claims 16-17 wherein said heating fluid is a liquid.

20. The process of any one of claims 2-15 further comprising:
admitting at least a portion of said combustion gas stream into a combustion gas cooler to separate at least a portion of said water component in said combustion gas stream, forming a first condensate stream;
recovering said first condensate stream; and
admitting at least a portion of said combustion gas stream into an auxiliary heat exchanger to transfer heat to said desorption fluid stream, wherein at least a portion of said desorption fluid stream comprises said first condensate stream.

21. The process of any one of claims 2-15 further comprising:
admitting at least a portion of said second product stream into a condenser to separate at least a portion of said water component from said second product stream, forming a second condensate stream; and
admitting at least a portion of said second condensate stream as at least a portion of said desorption fluid stream.

22. The process of any one of claims 2-15 further comprising:
admitting at least a portion of said second product stream into a plurality of condensers in a compression system to separate at least a portion of said water component from said second product stream, forming a plurality of interstage condensate streams; and
admitting said plurality of interstage condensate streams into one or more heat exchange conduits of a HRSG or an auxiliary heat exchanger.

23. The process of claim 20 wherein said first condensate stream is recovered at an amount equal to or greater than an amount sufficient for desorbing said first portion of said carbon dioxide component adsorbed on at least one said adsorbent material.

24. The process of any one of claims 20-21 wherein said first condensate stream and said second condensate stream are recovered at an amount equal to or greater than an amount sufficient for desorbing said first portion of said carbon dioxide component adsorbed on at least one said adsorbent material.

25. The process of any one of claims 1-24 further comprising admitting a natural gas stream as a said fuel stream, said oxidant stream, and said third product stream in said fuel combustor to produce said combustion gas stream having a carbon dioxide concentration greater than about 4%.

26. The process of claim 25 wherein said carbon dioxide concentration is greater than about 6%.

27. The process of claim 25 wherein said carbon dioxide concentration is greater than about 10%.

28. The process of claim 25 wherein said carbon dioxide concentration is greater than about 20%.

29. The process of claim 4, wherein said conditioning stream is admitted in a quantity sufficient to desorb substantially all of the remaining said carbon dioxide component adsorbed on at least one said adsorbent material.

* * * * *